United States Patent
Gideon

(12) 
(10) Patent No.: US 6,685,391 B1
(45) Date of Patent: Feb. 3, 2004

(54) GROUND SURFACE COVER SYSTEM WITH FLEXIBLE INTERLOCKING JOINT FOR EROSION CONTROL

(75) Inventor: Argaman Gideon, Hadera (IL)

(73) Assignee: Ackerstein Industries Ltd., Herzlia (IL)

( * ) Notice: Subject to any disclaimer, the term of this patent is extended or adjusted under 35 U.S.C. 154(b) by 0 days.

(21) Appl. No.: 09/958,831

(22) PCT Filed: May 3, 2000

(86) PCT No.: PCT/IL00/00254
§ 371 (c)(1),
(2), (4) Date: Oct. 15, 2001

(87) PCT Pub. No.: WO00/68506
PCT Pub. Date: Nov. 16, 2000

(30) Foreign Application Priority Data

May 6, 1999 (IL) ................................................. 129834

(51) Int. Cl.[7] ................................................. E02B 3/12
(52) U.S. Cl. ............................ 405/16; 405/17; 405/19; 405/20
(58) Field of Search ............................ 405/20, 19, 18, 405/17, 16, 15, 302.6, 302.4, 302.7

(56) References Cited

U.S. PATENT DOCUMENTS

| | | | | |
|---|---|---|---|---|
| 953,051 A | * | 3/1910 | De Muralt | 405/16 |
| 1,164,707 A | * | 12/1915 | Edinger | 405/20 |
| 1,164,708 A | * | 12/1915 | Edinger | 405/20 |
| 1,371,856 A | | 3/1921 | Cade | |
| 2,740,167 A | | 4/1956 | Rowley | |
| 3,301,147 A | | 1/1967 | Clayton et al. | |
| 3,347,048 A | * | 10/1967 | Brown et al. | 405/16 |
| 3,385,182 A | | 5/1968 | Harvey | |
| 3,572,224 A | | 3/1971 | Perry | |
| 3,859,000 A | | 1/1975 | Webster | |
| 4,037,377 A | | 7/1977 | Howell et al. | |
| 4,426,820 A | | 1/1984 | Terback et al. | |
| 4,436,447 A | * | 3/1984 | Crowe | 405/16 |
| 5,020,938 A | * | 6/1991 | Scales | 405/16 |
| 5,511,902 A | * | 4/1996 | Center | 405/16 |
| 5,556,228 A | * | 9/1996 | Smith | 405/16 |
| 5,580,191 A | | 12/1996 | Egan | |
| 5,797,237 A | | 8/1998 | Finkell | |
| 6,267,533 B1 | * | 7/2001 | Bourg | 405/16 |

* cited by examiner

Primary Examiner—Frederick L. Lagman
(74) Attorney, Agent, or Firm—Mark M. Friedman

(57) ABSTRACT

A flexible interlocking element (10) having opposing, interlocking ends (12, 14). Element end (12), features a contour, including element top surface segment (16), extending to bend (18), then defining a tongue element (34) extending downwardly along an incline (19), to inverted bend (20), which defines a tongue side (60) having a tangent (62). The contour of the tongue, further extending downward and around to bend (22), which defines a tongue tip (58). The tongue tip (58) having a bottom (54) with a tangent (56). The tongue further extending upward along incline (26), then further extending horizontally to bend (28), then further extending vertically downward to bend (30). Bend (30) defines the lower edge of bottom surface segment (32). Element end (14) features a contour including element top surface segment (36) extending horizontally to bend (38). A channel (52) is then defined by forming a side face of the element (14) to include, an upwardly extending bend (43), which further extends upward and around to bend (44), then downwardly along an incline to bend (46), which further extends vertically downward to bend (48), which defines the edge of a bottom surface segment (50).

36 Claims, 11 Drawing Sheets

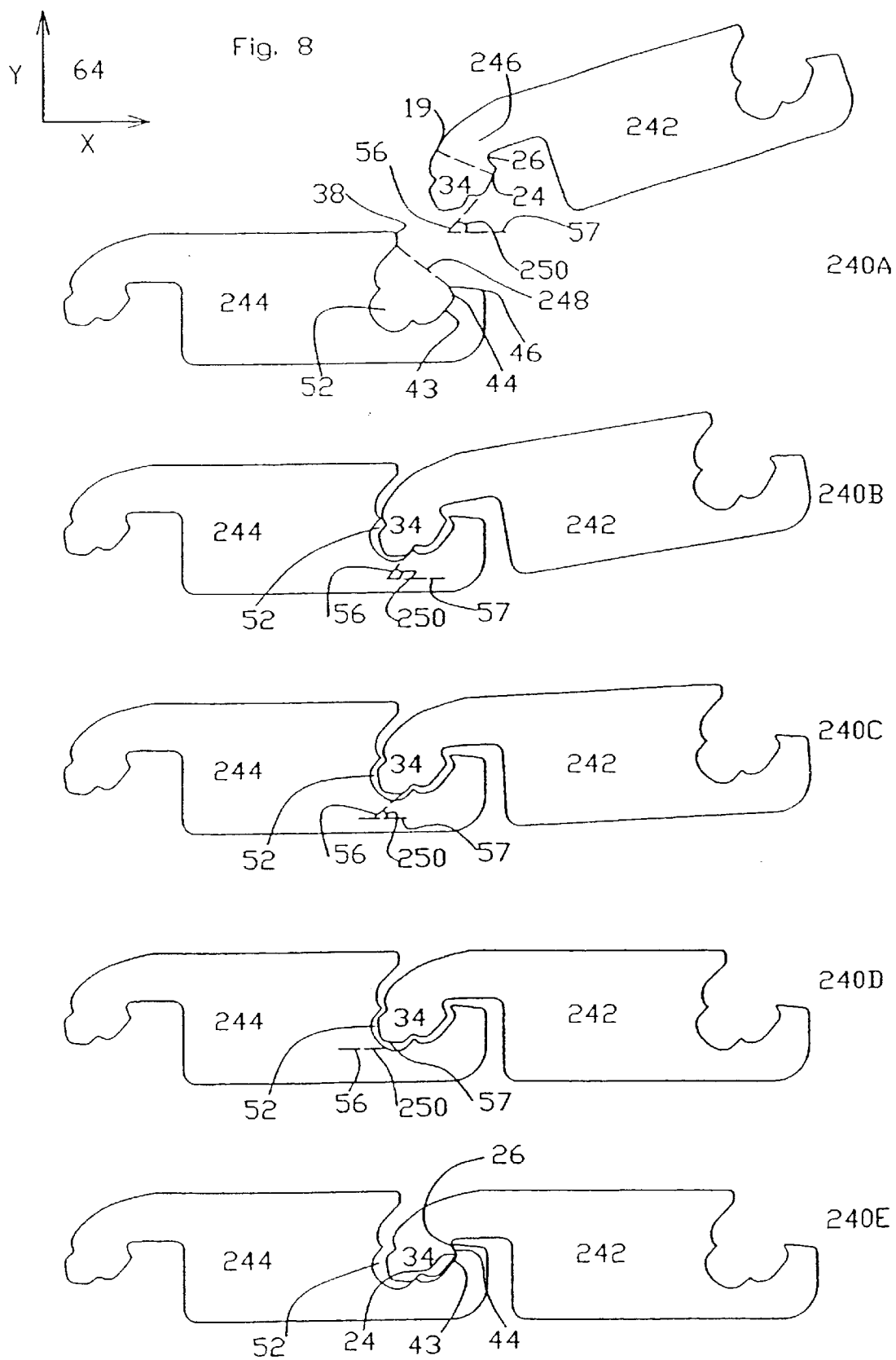

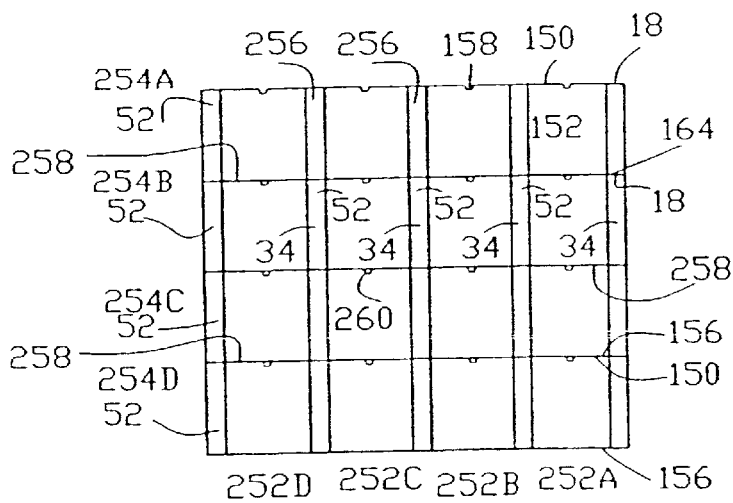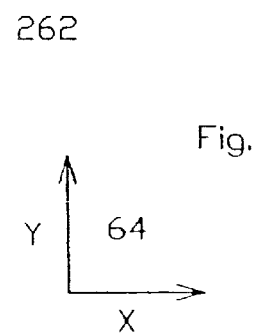
Fig. 9A
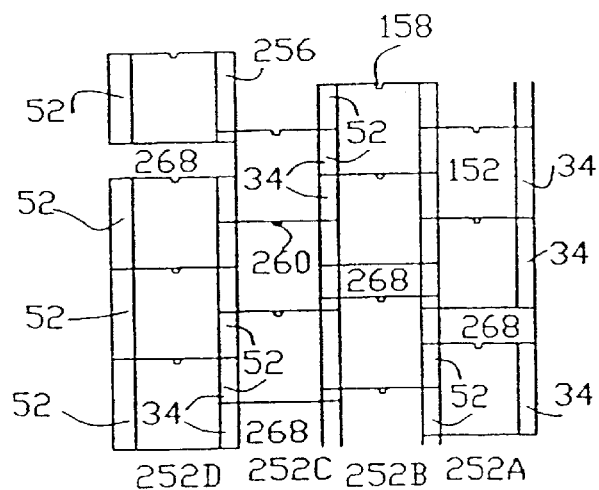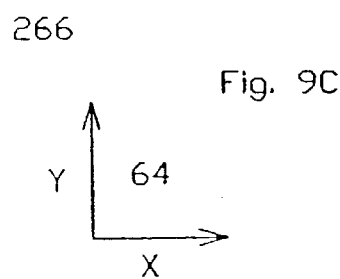
Fig. 9C
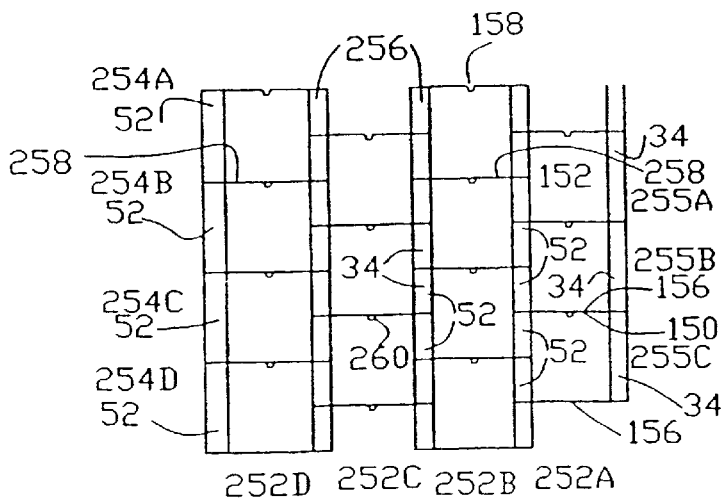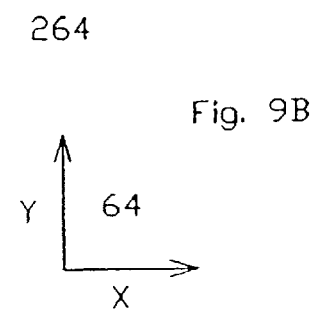
Fig. 9B

GROUND SURFACE COVER SYSTEM WITH FLEXIBLE INTERLOCKING JOINT FOR EROSION CONTROL

FIELD AND BACKGROUND OF THE INVENTION

The present invention relates to ground surface cover systems used for erosion control, and more particularly to a ground surface cover system featuring interlocking elements flexibly locked by a flexible interlocking joint, used for erosion control, and a corresponding method.

Erosion is a process involving the movement of earthy or rock material along a ground surface as result of natural processes including rain, wind, earthquakes and related movements in the ground, or man made processes such as water redistribution or the formation of artificial bodies of water, which are capable of moving earthy or rock material along the upper surface of the ground. Ordinarily, it is desirable to control erosion at elevated or inclined locations such as along roadsides, edges around bodies of water, for example, reservoirs, rivers, and lakes, and bridge to ground connections, where erosion is known to cause structural and environmental damage.

Currently, commonly used methods of effectively controlling erosion involve the placement of a ground cover on top of and along the surface of interest, of an area extending the region of desired erosion control. The main objective of placing ground cover is to adequately control or minimize the movement of earthy or rock material along the surface of the ground, whatever the cause of the movement. In terms of functionality, there are several important properties for a ground surface cover system to have in order to be effective. Foremost, an effective ground surface cover system needs to be made of sufficient strength and long term stability to withstand one or more of the elements causing erosion processes such as water, water flow, and ground movement, over long periods of time, i.e., years. At locations where water flow is involved in the erosion process, it is desirable for a ground surface covering to withstand, and allow for, efficient patterns of water flow and water distribution along the covered surface or ground. At locations where ground movement is involved in the erosion process, for example, involving cavity or protrusion formations at the ground surface, it is desirable for the ground surface cover system to horizontally, vertically, and angularly self-adjust, in a flexible way, along with ground movement, otherwise damage to the ground surface cover system may take place, thereby decreasing the effectiveness of subsequent erosion control at such locations. Instead of, or, in addition to self-adjustment, for the same reason, it is desirable for a ground surface cover system to be manually adjustable, or flexible, according to need. Hereinafter, the terms flexible and flexibility refer to horizontal, vertical, and/or angular motion or movement, whereby such motion or movement is of a ground surface cover system in general, of interlocking elements of a ground surface cover system, or, of the interlocking joint of the elements, in particular.

An additional, but optional, desired attribute of a ground surface cover system relates to landscape, involving the presence of spaces throughout the ground surface cover system enabling botanic growth. This attribute may or may not have functional importance to the ground surface cover system, depending upon the actual causes and parameters of an erosion process at a particular location, i.e., the presence of botanic growth throughout a ground surface cover system can affect patterns of water flow, movement of ground, and movement of the ground surface cover system itself. Other important attributes of a suitable ground cover system are economic based, whereby manufacturing and installation need to be feasible, practical, and of reasonable costs. Other attributes include the extent to which a ground surface cover system is replaceable and reusable either at a same location, at a different location, or both.

Several different types of ground surface cover systems are in common use. In addition to simply partially or completely covering the selected area of ground surface requiring erosion control with a multitude of removable individual stones, four main categories are ordinarily referred to with respect to ground surface cover systems, i.e., single cast structures, multi-cast structures, 'gabion' structures, and combination structures. Single cast ground surface cover systems are based on permanently covering the selected area of ground surface requiring erosion control with a layer of concrete alone, or, with a layer of concrete containing a dispersion of stones. Optional metal reinforcements internal to the cover material may be used throughout selected portions of the ground surface cover system. Multi-cast ground surface cover systems are based on the placement of a multitude of, removable, individual, geometrically formed, elements or blocks, usually made from concrete, which partially or incompletely cover the selected area of ground surface requiring erosion control. Gabion ground surface cover systems are based on the placement of gabion structures, featuring a continuous or discontinuous network or web like structured system of metal baskets or cages of specified geometries, dimensions, and rigidity, filled with a chosen density of loose, non-cemented stones. Combination ground surface cover systems are based on the placement of a plastic matting featuring concrete casting modules, typically of a honeycomb like geometry, upon the ground, and casting, on-site, the concrete modules. Individual concrete modules are relatively near to, but are not in contact with, each other.

Multi-cast ground surface cover systems may be further classified into two different types, i.e., systems based on interconnecting elements or locks, and systems based on interlocking elements or blocks. Hereinafter, interconnecting refers to the state or configuration of elements or blocks placed side-to-side or adjacent to each other, thereby forming a larger non-flexible pattern of such elements or blocks, where the elements or blocks are connected, and not locked, even loosely, to each other via element to element or block to block male to female connection or mating of any sort. Hereinafter, interlocking refers to the state or configuration of elements or blocks which are placed in contact with each other via some sort of element to element or block to block male to female interlocking connection or mating, thereby forming a larger non-flexible or flexible pattern of such elements or blocks, where the elements or blocks are locked to each other. In this case, the interlocking connection or mating between any two elements or blocks forms a joint, where the joint is comprised of a male component structural feature such as a hook, protrusion, extension, barb, tongue, or nose, compatible with and interlocked to a corresponding female component structural feature such as a recess, opening, or related cutout structural feature. According to present usage, an interlocking element to element or block to block joint may be non-flexible or flexible, whereby flexibility refers to the capability of movement or turning in a horizontal or vertical direction without damaging or breaking the interlocking joint, or the elements or blocks.

In regard to multi-cast ground surface cover systems, current teachings of interlocking ground surface cover systems are based on individual elements interlocked by rigid or fixed, non-flexible joints between the elements, resulting in no degrees of freedom for vertical or horizontal movement. This characteristic of multi-cast interlocking element systems presents several significant limitations for application of such systems to erosion control. As will be shown, the system of the present invention overcomes many such limitations by featuring a flexible joint between interlocking elements of a multi-cast ground surface cover system for producing an effective erosion control system. There is a need for, and it would be useful to have a multi-cast interconnecting ground surface cover system which overcomes the limitation of non-flexibility of the system, in general, and non-flexibility of the joint of the interlocked elements, in particular, thereby resulting in a more effective erosion control system.

An ideal ground surface cover system for effective erosion control would feature all the above mentioned properties and attributes necessary for achieving the objective of adequately controlling or minimizing ground movement during a potential erosion process, including high strength and long term stability, patterns for efficient water flow and water distribution, flexible adjustment to ground movement, capability of including landscape, economic and feasible manufacturing and installation, replaceability, and reusability. It will be shown that incorporating the feature of flexibility into a ground surface cover system leads to significantly better achievement of having all of these properties and attributes of an effective erosion control system. In practice, each of the above categories of currently employed ground surface cover systems features varying degrees of limitations or shortcomings by lacking one or more of the above mentioned properties and attributes. Typically, multi-cast ground surface cover systems feature more of the above indicated properties and attributes for providing erosion control, especially with respect to the attribute of being non-permanent and removable, in contrast to single cast ground surface cover systems, and are thus more commonly employed for erosion control. Specific limitations of currently employed ground surface cover systems for erosion control follow. Each limitation is related, either directly or indirectly, to the absence of the feature of flexibility of the ground surface cover system as a whole, or to the absence of the feature of flexibility of the interlocking joint between the two elements.

For single cast ground surface cover systems, with respect to distribution of water flow, once a single cast ground surface cover system is installed on-site, the general characteristics of water flow are essentially fixed, i.e., random top to bottom flow, according to the single cast structure, and depend only upon variation in the influences causing erosion, for example, strength and velocities of rain and/or wind acting upon the ground surface cover. With respect to flexibility or adjustment to ground movement, by the very nature of a single cast ground surface cover system, there is none. That is, by sufficient forces in the ground causing cavity or protrusion formation at the ground surface, a single cast ground cover system becomes damaged, requiring on-site repair of the local and surrounding area of the single component ground surface cover which has either fallen into the cavity or protrudes from the surface. With respect to landscape, by the very nature of a single cast ground surface cover system covering the entirety of a given ground surface area, there is no space left for practically including any kind of ground landscape such as botanical growth. With respect to installation, inherently, single cast ground surface cover systems involve substantial on-site work relating to the placement of stones and casting of cement. With respect to reusability, inherently, single cast ground surface cover systems represent a one time installation, whereby, it would be extremely work intensive and economically unfeasible to remove or replace parts of the casted mixture of stones and cement.

For gabion structure ground surface cover systems, degree of limitation or shortcoming of a given property or attribute is directly related to the parameters of the system, including for instance extent or area, dimensions, and density, of the gabion structures lying on and rising above the ground surface. Gabion structures are generally rigid with respect to forces exerted by water flow or ground movement. As such, gabion ground surface cover systems provide limited control of water flow and distribution, which are based primarily on random top to bottom water flow through the stones contained within the metal baskets or cages. Depending upon stone density within the baskets or cages, over long periods of time, the stones contained within the baskets or cages of gabion structures are expected to shift, possibly leaving the baskets or cages, and may accumulate along an inclined area of potential erosion, due to gravity and influences of rainfall and wind shear, thereby causing changes in the overall gabion structure, possibly adversely affecting the efficiency of such an erosion control system. Installation of gabion structures for erosion control is ordinarily labor intensive and therefore costly, compared to installation of other erosion control systems. Moreover, as the baskets or cages of gabion structures are of metal, they are prone to corrosion following exposure to water, where the extent of corrosion depends upon the quality of metal used. Either using high quality corrosion resistant metal for the baskets or cages, or replacing baskets or cages as they corrode, clearly increases the cost of using gabion ground surface cover systems for erosion control.

Combination ground surface cover systems, based on the placement of a plastic matting, upon the ground, featuring a network of individual modules of casted concrete, is limited in several ways. Once cast, the network of concrete modules is essentially permanently fixed and non-flexible with respect to control of water flow, water distribution, and adjustment to ground movement. Moreover, since the system is based on having plastic matting covering the ground of interest, there is limited accommodation for the addition of botanic landscape. Combination erosion control systems are also significantly limited due to the need for on-site casting. In this case, typically, the quality of concrete and of the casted concrete modules are significantly less than that of multi-cast ground surface cover systems featuring concrete elements manufactured off-site and transported to the chosen site for installation. Moreover, the plastic matting and concrete modules of combination ground surface cover systems are not readily amenable to replacement or reuse.

Multi-cast interconnecting, i.e., not interlocking, element ground surface cover systems have the significant limitation of individual elements potentially being uplifted or submerged, in an unstable manner, during conditions of underground movements, i.e., cavity or protrusion formation, respectively. Under such conditions, there is the possibility of multiple elements of the interconnecting element system to move around, causing changes in patterns of water flow and water distribution, thereby, potentially adversely affecting effectiveness of erosion control. With respect to including landscape throughout an interconnecting element ground surface cover system by leaving spaces between elements, there is the limitation that, since the elements are not locked to each other, landscape spaces between elements must be maintained by a perimeter of elements. Moreover, future changes in landscape throughout such a system would require careful re-arrangement of several interconnecting elements, not simply by moving around one or two elements, in order to maintain overall system strength and stability for the purpose of providing erosion control. Related to this limitation of interconnecting element ground surface cover systems, is that of limited replaceability of individual elements. Again, since elements of an interconnecting element system are not locked to each other, moving any given element affects positioning and stability of its neighboring elements.

Multi-cast interlocking, i.e., not interconnecting, element ground surface cover systems, featuring non-flexible joints, have the potential of elements being damaged or broken under conditions of ground cavity or protrusion formation, due to the rigid nature of the fixed joints between the individual elements, especially for elements made of concrete. As a result of this, patterns of water flow and distribution are likely to change, thereby affecting erosion control effectiveness in an unpredictable manner. Additionally, with respect to water flow and distribution, as an example, placement of a rigid hollow honeycomb like or other hollow polygonal multi-cast interlocking structure at a location of erosion results in inefficient and poor control of water distribution and water flow during rainfall, whereby, water accumulates inside the honeycombs or polygonal structures, potentially leading to excessive wetting of the ground underneath the ground surface cover, with minimal possibility of water flow from top to bottom of the ground surface covering, except under flooding conditions of the individual honeycombs or polygonal structures. Another significant limitation of multi-cast interlocking element ground surface cover systems is that individual elements of such a systems are not readily replaceable, as several interlocked elements need to be removed one at a time before removing a particular element, due to the linked structure of interlocking element systems.

Based on limitations of currently employed ground surface cover systems, there is thus a need for, and it would be useful to have a ground surface cover system featuring interlocking elements flexibly locked by a flexible interlocking joint, used for erosion control, and a corresponding method. Such a system and corresponding method would overcome all of the above indicated limitations regarding effective erosion control.

Specific examples of multi-cast interconnecting ground surface cover systems currently available are those manufactured by Unglehrt GMBH & Co., Gronenbach-Zell, Germany; Franz Carl Nudling, Fulda, Germany; and Kasper Rockelein KG, Wachenroth, Germany. Each of these currently available ground surface cover systems has the above described limitations with respect to erosion control.

The present invention relates to ground surface cover systems used for erosion control, and specifically to a ground surface cover system featuring interlocking elements flexibly locked by a flexible interlocking joint, and a corresponding method, used for erosion control. There is substantial prior art regarding elements, systems, and methods based on, or including, interlocking elements for construction of floors, panels, and load bearing surfaces such as roads or airplane landing mats. However, none of the following indicated prior art refers to erosion control of a ground surface, or includes the important feature of having directional, i.e., vertical or horizontal, flexibility of the system, or of interlocking elements flexibly locked by a flexible joint. Moreover, prior art relating to elements, systems and methods featuring interlocking elements teach about rigidity or non-flexibility of the interlocking element joints, thereby preventing vertical or horizontal movement of parts of an entire system or of the individual elements. Furthermore, interlocking elements and systems of interlocking elements taught about in the following prior art are preferably made from wood, metal, polymer, composite material, or combinations thereof, and not of concrete which is preferably used for making ground surface cover systems for erosion control.

One teaching, U.S. Pat. No. 5,580,191 issued to Egan, describes a retaining wall, preferably for marine use, featuring interconnecting and interlocking elements, used for erosion control along a vertical wall adjacent to a body of water. The following prior art relates to flooring or paneling elements, systems or methods based on, or including, non-flexible interlocking elements: U.S. Pat. No. 5,797,237 issued to Finkell, Jr.; U.S. Pat. No. 4,426,820 issued to Terback et al.; U.S. Pat. No. 4,037,377 issued to Howell et al.; and U.S. Pat. No. 2,740,167 issued to Rowley. The following prior art relates to elements, systems, and methods based on, or including, non-flexible interlocking elements for constructing load bearing surfaces such as roads and airplane landing mats: U.S. Pat. No. 3,859,000 issued to Webster; U.S. Pat. No. 3,572,224 issued to Perry; U.S. Pat. No. 3,385,182 issued to Harvey; U.S. Pat. No. 3,301,147 issued to Clayton et al.; and U.S. Pat. No. 1,371,856 issued to Cade.

SUMMARY OF THE INVENTION

The present invention relates to a ground surface cover system featuring interlocking elements flexibly locked by a flexible interlocking joint, and a corresponding method used for erosion control.

The ground surface cover system of the present invention introduces the important property of flexibility to the utilization of multi-cast interlocking elements for erosion control. The flexible interlocking joint of the present invention is featured with a corresponding preferred method of mechanically engaging two interlocking elements to each other, and is extended to a preferred method of forming a system of a ground surface cover featuring different patterns of interlocking elements to be used for ground surface erosion control. Several additional specific features of the interlocking elements, further enabling the ground surface cover system of the present invention for erosion control, are provided.

The ground surface cover system and method of the present invention serve as significant improvements over currently used ground surface cover systems and methods used for erosion control. The system and method of the present invention would result in overcoming each of the above indicated limitations regarding effective erosion control, by featuring properties and attributes necessary for achieving the main objective of effectively controlling or minimizing ground movement during a potential erosion process, including high strength and long term stability, patterns for efficient water flow and water distribution, flexible adjustment to ground movement, capability of including landscape, economic and feasible manufacturing and installation, replaceability, and reusability.

According to the present invention, there is provided a ground surface cover system for use in erosion control of a ground surface, the ground surface cover system comprising at least one layer upon the ground surface of a plurality of interlocking elements, wherein opposing ends of a pair of opposing interlocking elements are flexibly interlocked by a flexible interlocking joint, the flexible interlocking joint defining mechanical engagement of an interlocking element tongue transversely extending outward from one opposing end of a first interlocking element of the pair to an interlocking element channel transversely extending outward from one opposing end of a second interlocking element of the pair.

According to the present invention, there is provided a method of erosion control of a ground surface, the method comprising the steps of: (a) providing the ground surface to be erosion controlled; and (b) covering the ground surface with at least one layer of a plurality of interlocking elements, wherein opposing ends of a pair of opposing interlocking elements are flexibly interlocked by a flexible interlocking joint, the flexible interlocking joint defining mechanical engagement of an interlocking element tongue transversely extending outward from one opposing end of a first interlocking element of the pair to an interlocking element channel transversely extending outward from one opposing end of a second interlocking element of the pair.

According to the present invention, there is provided a flexible interlocking joint of interlocking elements for use in a ground surface cover for erosion control of a ground surface, the flexible interlocking joint comprising an interlocking element tongue transversely extending outward from one opposing end of a first interlocking element of a pair of the interlocking elements mechanically engaged to an interlocking element channel transversely extending outward from one opposing end of a second interlocking element of the pair of the interlocking elements.

BRIEF DESCRIPTION OF THE DRAWINGS

Reference is now made to the drawings which illustrate the preferred embodiments the invention may take in physical form and in certain parts and arrangements of parts wherein:

FIG. 8 is a schematic sequential series of side views illustrating a method of interlocking the elements via the flexible interlocking joint, in accordance with the present invention;

FIG. 9A is a schematic top view of the system of interlocking elements, in a closed, non-staggered pattern, in accordance with the present invention;

FIG. 9B is a schematic top view of the system of interlocking elements, in a closed, staggered pattern, in accordance with the present invention;

FIG. 9C is a schematic top view of the system of interlocking elements, in an open, staggered pattern, in accordance with the present invention;

DESCRIPTION OF THE PREFERRED EMBODIMENTS

The present invention is of a ground surface cover system featuring interlocking elements flexibly locked by a flexible interlocking joint, and a corresponding method. The components and operation of the ground surface cover system featuring interlocking elements flexibly locked by a flexible joint, according to the present invention, are better understood with reference to the drawings and the accompanying description. For the purpose of providing logical flow of an appropriate description of the preferred embodiments of the present invention, the drawings and accompanying description are arranged in the following order: describing the flexible interlocking joint of the interlocking elements used for producing the ground surface cover system of this invention, describing exemplary parts of the system featuring different configurations of the interlocking elements and element components used for forming the flexible interlocking joint of this invention, describing different configurations of individual interlocking elements, describing a method of interlocking the elements via the flexible interlocking joint of this invention, describing different patterns of the ground surface cover system of this invention, and describing preferred methods for applying the ground surface cover system of this invention to realistic scenarios of erosion control.

It is to be noted that the drawings and accompanying description of the present invention shown here are for illustrative purposes only, representing preferred embodiments of the invention, and are not meant to be limiting. Throughout the drawings, same reference numbers represent same indicated features of the invention or parts of the invention shown and described in the figures. Typically, in addition to initial reference and description of features or components of the interlocking elements of the present invention, only those previously referenced and described same features or components relevant to understanding another indicated figure are repeated in that indicated figure.

Figure 1A:
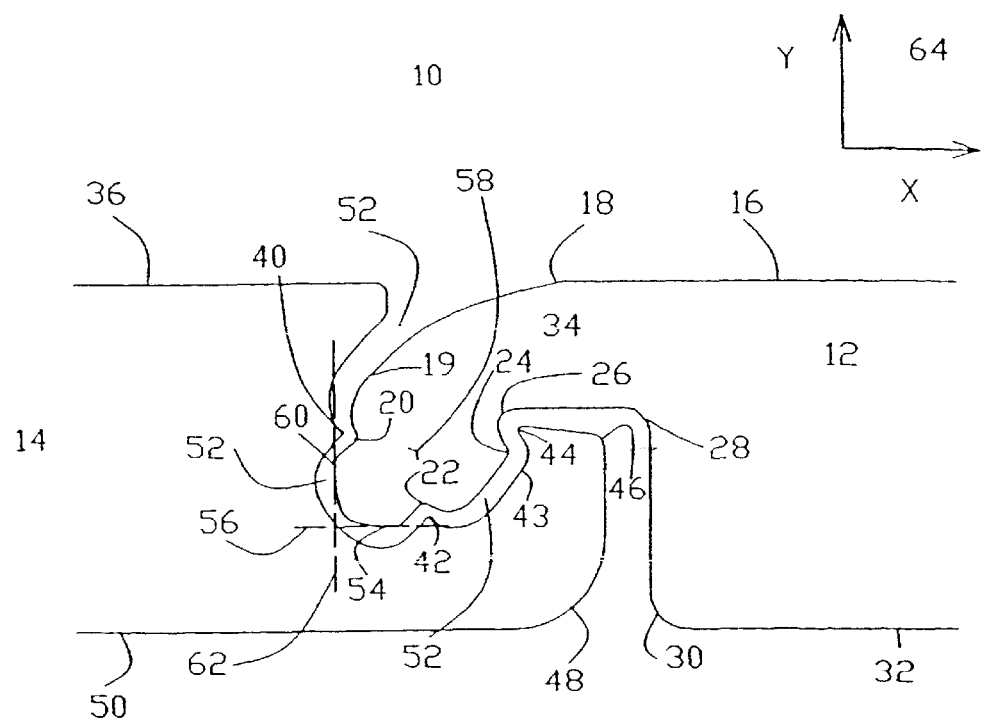
FIG. 1A is a schematic close-up side view illustrating the flexible interlocking joint of the interlocking elements in a neutral position, in accordance with the present invention.

Referring now to the drawings, FIG. 1A is a schematic close-up side view illustrating the flexible interlocking Joint of the interlocking elements in a neutral, i.e., non-flexed non-contact, position. The flexible interlocking joint, in a neutral position, generally referenced as 10, is formed from interlocking, mechanically engaging or mating two interlocking elements, which are partially shown here and generally referenced as interlocking element end 12 and interlocking element end 14. Element end 12 features a contour including element top surface segment 16 extending horizontally to bend 18, further extending downward along an incline to bend 20, further extending downward and around to bend 22, further extending upward and around to bend 24, further extending upward along an incline to bend 26, further extending horizontally to bend 28, further extending vertically downward to bend 30, and further extending horizontally along element bottom surface segment 32. That part of the contour of element end 12, extending from bend 18 through bends 20 and 22, and through bends 24, 26, and 28, forms a male type element or joint interlocking component, tongue 34.

Element end 14 features a contour including element top surface segment 36 extending horizontally to bend 38, further extending downward along an incline to bend 40, further extending downward and around to bend 42, further extending upward and around bend 43, further extending upward and around to bend 44, further extending downward along an incline to bend 46, further extending vertically downward to bend 48, and further extending horizontally along element bottom surface segment 50. The contour of element end 14, extending from bend 38 through bends 40 and 42, and through bend 46, forms a female type element or joint interlocking component, channel 52.

Channel 52 of element end 14, is contoured, of variable shape having variable dimensions, appropriate for insertion or mechanical engagement of tongue 34 of element end 12, providing a joint for flexibly locking elements of a ground surface cover system for erosion control. Further illustration and description of preferred shapes and dimensions of tongue 34 and of channel 52 are provided in FIGS. 4D–4E. The presence of tongue 34 of element end 12, inside of channel 52 of element end 14, forms flexible interlocking joint 10. Flexible interlocking joint 10 has dual functionality, enabling multi-directional and angular flexibility or movement of tongue 34 relative to channel 52, following engagement of tongue 34 with channel 52, simultaneous to enabling the corresponding elements to remain in an interlocked position. By design, disengagement of tongue 34 from channel 52 is limited to a small range of positions and angles of tongue 34 relative to channel 52, according to actual relative shapes and dimensions of tongue 34 and channel 52, in general, and, in particular, due to the presence of tongue surface segment extending along bend 22, bend 24, and bend 26 relative to the presence of channel surface segment extending along bend 43, bend 44, and bend 46. This dual functionality is directly translated to the ground surface cover system of the present invention for the objective of providing a feasible and effective system of erosion control.

Tongue 34 of element end 12 includes tongue tip 58, where tongue tip 58 features the region extending from bend 20 through bend 22. Tongue tip 58 includes a tongue tip bottom 54, with a corresponding tongue tip bottom tangent 56 drawn as reference, and a tongue tip side 60, with a corresponding tongue tip side tangent 62 drawn as reference. Coordinate system 64, featuring an x-axis positioned 90 degrees from, or perpendicular to, a y-axis, is included in FIG. 1A as reference for the purpose of describing the positioning and flexibility of the flexible joint 10 of the interlocking elements of the present invention. For the flexible joint 10 illustrated in FIG. 1A in the neutral position, tongue tip bottom tangent 56 is parallel to the x-axis, and tongue tip side tangent 62 is parallel to y-axis, of coordinate system 64, respectively. Moreover, for flexible joint 10 in the neutral position, tongue 34 is mechanically engaged, but not in physical contact with, element end 14, whereby a gap exists between the contour of tongue 34 and the contour of channel 52. For the preferred embodiment of the invention, bottom surface segment 32 of element end 12 lies parallel to and in the same plane as bottom surface segment 50 of element end 14.

Figure 1B:
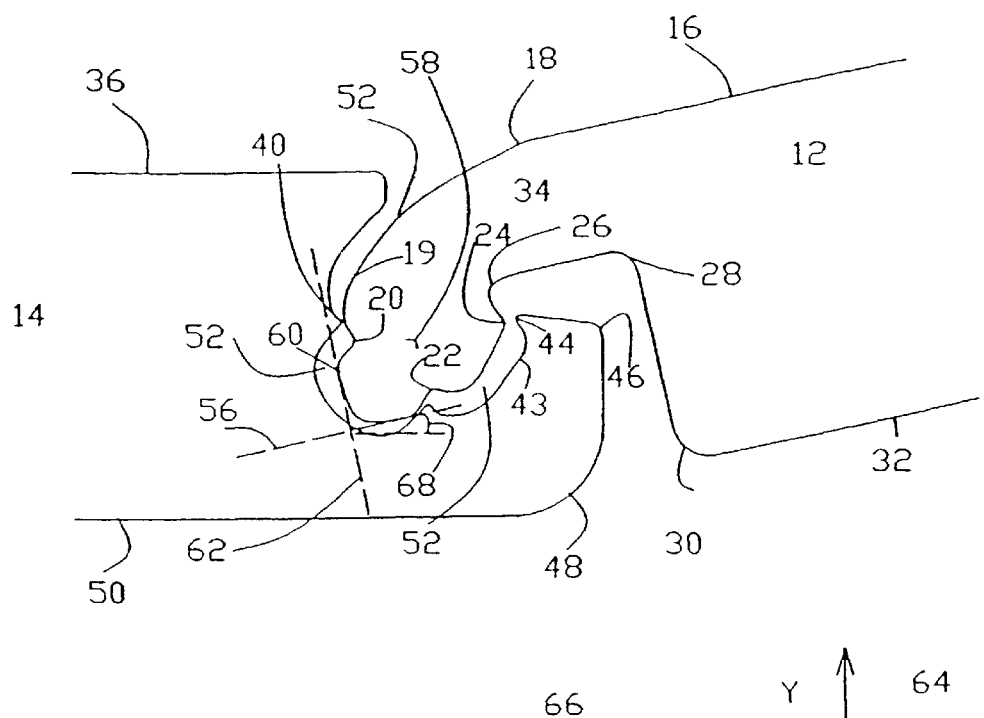
FIG. 1B is a schematic close-up side view illustrating the flexible interlocking joint of the interlocking elements following angular movement, in accordance with the present invention.

FIG. 1B is a schematic close-up side view illustrating the flexible interlocking joint of the interlocking elements following angular movement. The flexible interlocking joint, following angular movement, generally referenced as 66, is formed by rotation of element end 12 with respect to element end 14. In this illustration, element end 12 is rotated counterclockwise through an angle 68, with coordinate system 64 as reference point of rotation. In practice, according to actual dimensions of tongue 34 and channel 52, angle 68 is preferably less than sixty degrees. For flexible joint 66 illustrated in FIG. 1B in the flexed angular position, tongue tip bottom tangent 56 is rotated away from the x-axis, and tongue tip side tangent 62 is rotated away from the y-axis, of coordinate system 64, respectively, through angle 68. Moreover, for flexible joint 66 in the flexed angular position, tongue 34 may be in physical contact with element end 14, and preferably, bottom surface segment 32 of element end 12 is positioned at an angle with respect to bottom surface segment 50 of element end 14.

Figure 1C:
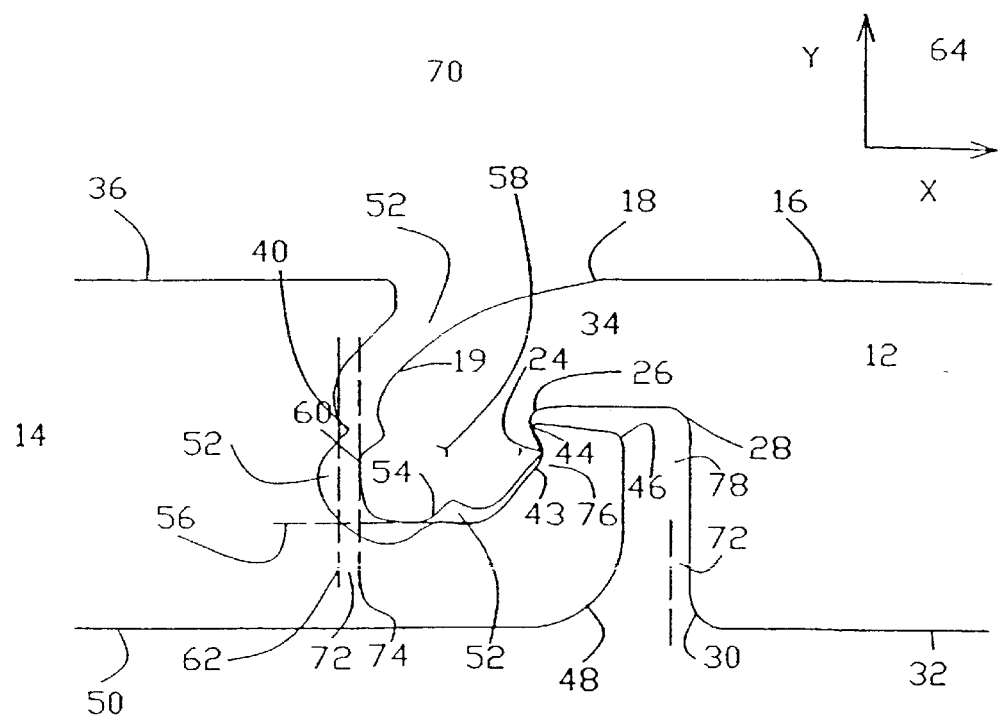
FIG. 1C is a schematic close-up side view illustrating the flexible interlocking joint of the interlocking elements following horizontal movement, in accordance with the present invention.

FIG. 1C is a schematic close-up side view illustrating the flexible interlocking joint of the interlocking elements following horizontal movement. The flexible interlocking joint, following horizontal movement, generally referenced as 70, is formed by horizontal or lateral movement of element end 12 with respect to element end 14. In this illustration, element end 12 is horizontally moved a distance 72, along tongue tip bottom tangent 56, where distance 72 is represented by the distance between new tongue tip side tangent 74 and neutral position tongue tip side tangent 62 (of FIG. 1A), with coordinate system 64 as reference point of horizontal movement. For the horizontal movement of flexible joint 70, tongue tip bottom tangent 56 is parallel to the x-axis, and new tongue tip side tangent 74 is parallel to y-axis, of coordinate system 64, respectively. Moreover, for flexible joint 70 in this flexed position following horizontal movement, according to extent of horizontal movement, tongue 34 may be in physical contact with element end 14. This is indicated by contact point 76, where bend 24 of tongue 34 is in contact with the surface region of channel 52 of element end 14. Preferably, following horizontal movement of element end 12 with respect to element end 14, bottom surface segment 32 of element end 12 lies parallel to and in the same plane as bottom surface 50 segment of element end 14.

Figure 1D:
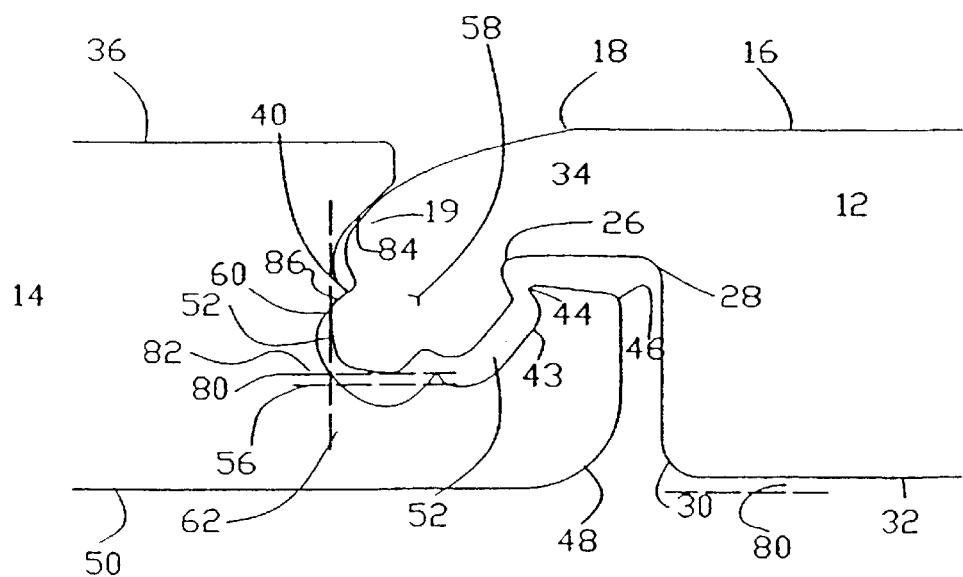
FIG. 1D is a schematic close-up side view illustrating the flexible interlocking joint of the interlocking elements following vertical movement, in accordance with the present invention.

FIG. 1D is a schematic close-up side view illustrating the flexible interlocking joint of the interlocking elements following vertical movement. The flexible interlocking joint, following vertical movement, generally referenced as 78, is formed by vertical movement of element end 12 with respect to element end 14. In this illustration, element end 12 is vertically moved up a distance 80, along tongue tip side tangent 62, where distance 80 is represented by the distance between new tongue tip bottom tangent 82 and neutral position tongue tip bottom tangent 56 (of FIG. 1A), with coordinate system 64 as reference point of vertical movement. For vertical movement of flexible joint 78, new tongue tip bottom tangent 82 is parallel to the x-axis, and tongue tip side tangent 62 is parallel to y-axis, of coordinate system 64, respectively. Moreover, for flexible interlocking joint 78 in this flexed position following vertical movement, according to extent of vertical movement, tongue 34 may be in physical contact with element end 14. This is indicated by contact point 84 and contact point 86, where surface region of channel 52 of element end 14 extending from bend 40 to bend 38 is in contact with the surface of tongue 34 of element end 12. Preferably, following vertical movement of element end 12 with respect to element end 14, bottom surface segment 32 of element end 12 lies parallel to and in a different plane as bottom surface segment 50 of element end 14.

It is to be noted that flexible interlocking joints 10, 66, 70, and 78, featured components, and different positions of movement or flexibility thereof, as illustrated in FIGS. 1A–1D, are representative of the interlocking elements forming the ground surface cover system of the present invention. Interlocking element top surface regions in continuity with, and extending from top surface segment 16, or extending from top surface segment 36, to the opposite element end (not shown in FIGS. 1A–1D) of the same corresponding interlocking element may be of variable configuration, including, but not limited to, level, ridged, or elevated, with variable dimensions. Likewise, interlocking element bottom surface regions in continuity with, and extending from bottom surface segment 32, or extending from bottom surface segment 50, to the opposite element end (not shown in FIGS. 1A–1D) of the same corresponding interlocking element may be of variable configuration, including, but not limited to, level, ridged, or elevated, with variable dimensions.

Figure 2A:
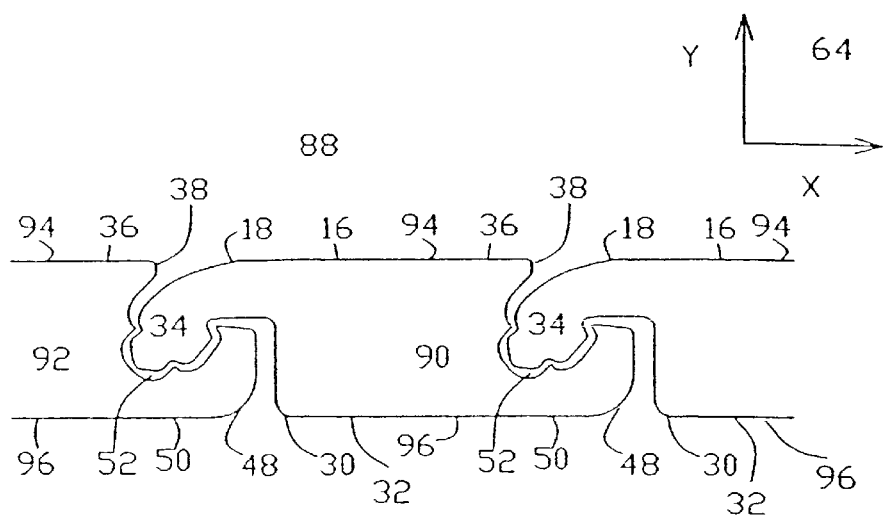
FIG. 2A is a schematic side view illustrating part of the system featuring level top and bottom configured elements interlocked by the flexible interlocking joint, in accordance with the present invention.

FIG. 2A is a schematic side view illustrating part of the system featuring level top and bottom configured elements interlocked by the flexible interlocking joint. The part of the system featuring level top and bottom configured elements interlocked by flexible joints 90 and 92, is generally referenced as 88. In this figure, interlocking element top surface segment 94, in continuity with, and extending from element end top surface segment 16 to element opposite end top surface segment 36 is configured as level. Interlocking element bottom surface segment 96, in continuity with, and extending from element end bottom surface segment 32 to element opposite end bottom surface segment 50 is also configured as level. In system 88, flexible joints 90 and 92, featuring element or joint tongue 34 mechanically engaged to element or joint channel 52 are variably positioned and flexible according to the description provided in FIGS. 1A–1D.

Figure 2B:
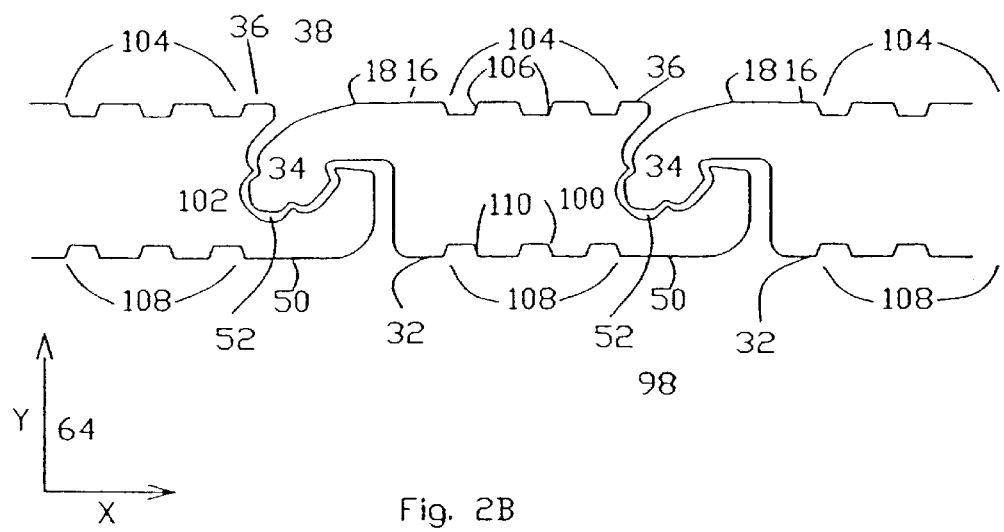
FIG. 2B is a schematic side view illustrating part of the system featuring ridged top and bottom configured elements interlocked by the flexible interlocking joint, in accordance with the present invention.

FIG. 2B is a schematic side view illustrating part of the system featuring ridged top and bottom configured elements interlocked by the flexible interlocking joint. The part of the system featuring optional ridged top and bottom configured elements interlocked by flexible joints 100 and 102, is generally referenced as 98. In this figure, interlocking element top surface segment 104, in continuity with, and extending from element end top surface segment 16 to element opposite end top surface segment 36 is configured as ridged. Exemplary ridge 106 of ridged configured interlocking element top surface segment 104 may be of variable dimensions and frequency, as described in detail in FIG. 5A. Interlocking element bottom surface segment 108, in continuity with, and extending from element end bottom surface segment 32 to element opposite end bottom surface segment 50 is also configured as ridged. Exemplary ridge 110 of ridged configured interlocking element bottom surface segment 108 may also be of variable dimensions, as described in detail in FIG. 5A. In system 98, flexible joints 100 and 102, featuring element or joint tongue 34 mechanically engaged to element or joint channel 52, are variably positioned and flexible according to the description provided in FIGS. 1A–1D.

The presence of ridges along the top surface and/or bottom surface of one or more of the interlocking elements is functional with respect to hydrological, stability, and landscape properties of the ground surface cover system for erosion control. Ridged configured interlocking element top surface segment. 104 enables control of, and affects water flow and water distribution throughout the system of interlocking elements, based on interaction of flowing water with the ridges. Ridged configured interlocking element bottom surface segment 108 enables control of, and improves anchoring of the system of interlocking elements, based on interaction of the ground surface with the ridges 110. This alternative feature of the interlocking elements of the invention results in a more stable erosion control system with respect to water flow and water distribution during possible ground movement due to an erosion process. Another result of increased stability is better preservation of botanic landscape which may be placed in spaces in between interlocking elements.

Figure 2C:
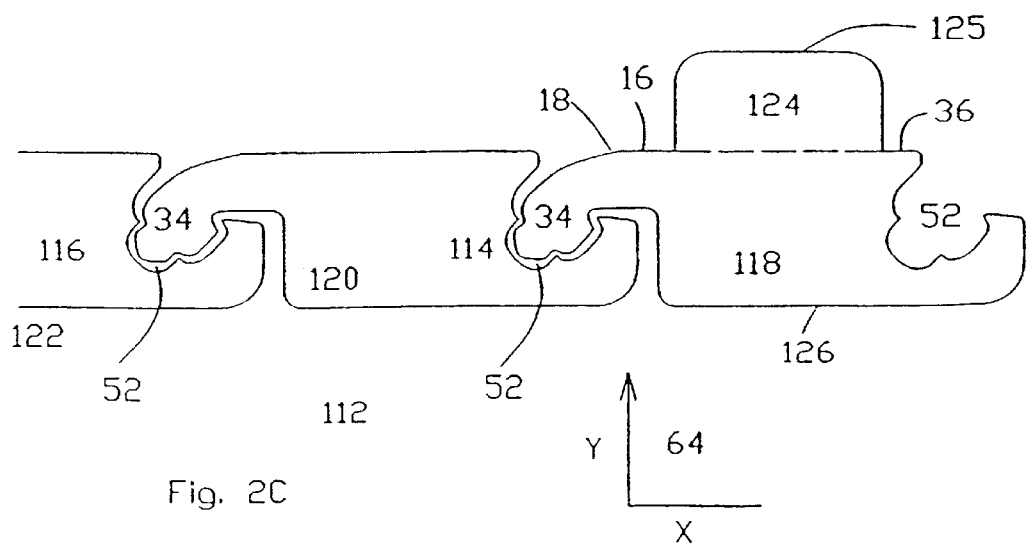
FIG. 2C is a schematic side view illustrating part of the system featuring an elevated level top and level bottom configured element interlocked by the flexible interlocking joint, in accordance with the present invention.

FIG. 2C is a schematic side view illustrating part of the system featuring an elevated level top and level bottom configured element interlocked by the flexible interlocking joint. The part of the system featuring an optional elevated level top configured element 118 interlocked to a level top and level bottom configured element 120 by flexible joint 114) which in turn is interlocked to another level top and level bottom configured interlocking element 122 by flexible joint 116, is generally referenced as 112. In this figure, element top surface region 124 of element 118 in continuity with, and extending from element end top surface segment 16 to element opposite end top surface segment 36, is configured as elevated, and features level top surface segment 125. Element bottom surface segment 126 of element 118 is shown as level configured, but may be configured as, including, but not limited to, level, ridged, or elevated. Exemplary elevated configured interlocking element top surface region 124 may be of variable dimensions, as described in detail in FIG. 6A. In system 112, flexible joints 114 and 116, featuring element or joint tongue 34 mechanically engaged to element or joint channel 52, are variably positioned and functional according to the description provided in FIGS. 1A–1D.

The presence of an elevated element top surface region of one or more of the interlocking elements is functional with respect to hydrological properties of the ground surface cover system for erosion control. Elevated configured interlocking element top surface region 124 enables control of, and affects water flow and water distribution throughout the system of interlocking elements, based on interaction of flowing water with the elevation.

Figure 3:
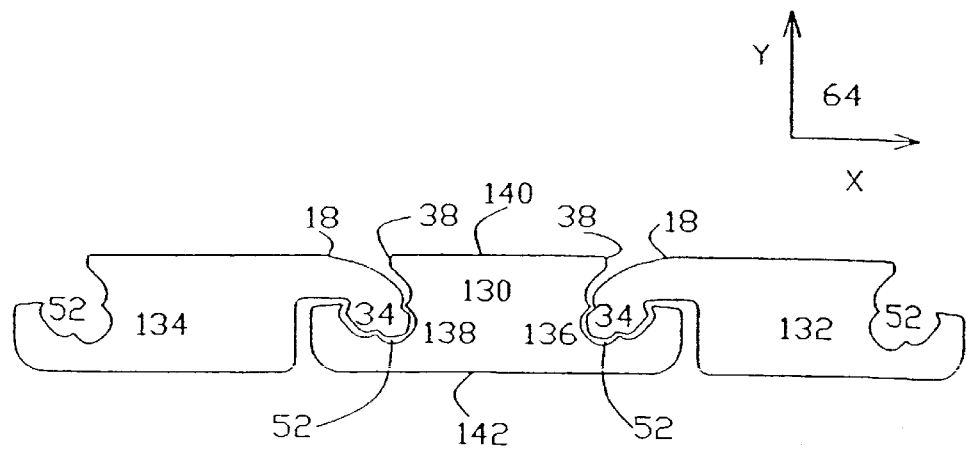
FIG. 3 is a schematic side view illustrating part of the system featuring level top and bottom configured elements interlocked to a level top and bottom configured center element, via the flexible interlocking joint, in accordance with the present invention.

FIG. 3 is a schematic side view illustrating part of the system featuring level top and level bottom configured elements interlocked to a level top and level bottom configured center element, via the flexible interlocking joint. As shown in FIG. 3, center interlocking element 130 features two identical element or joint channels 52 (FIG. 1A), each being compatible for mechanical engagement via mating or interlocking to an element or joint tongue 34 (FIG. 1A) of another interlocking element. The part of the system featuring a level top configured center element 130 interlocked to a first, level top and level bottom configured element 132 by flexible joint 136, and interlocked to a second, level top and level bottom configured interlocking element 134 by flexible joint 138, is generally referenced as 128. In this figure, center element top surface segment 140, and center element bottom surface segment 142, of center element 130, are each configured as level, but each center element surface segment 140 or 142 may be configured as, including, but not limited to, level, ridged, or elevated, in accordance with the descriptions of FIGS. 2A–2C. Exemplary level configured interlocking element 130 may be of variable dimensions, as described in detail in FIG. 7. In system 128, flexible joints 136 and 138, featuring element or joint tongue 34 mechanically engaged to element or joint channel 52, are variably positioned and functional according to the description provided in FIGS. 1A–1D.

Figure 11:
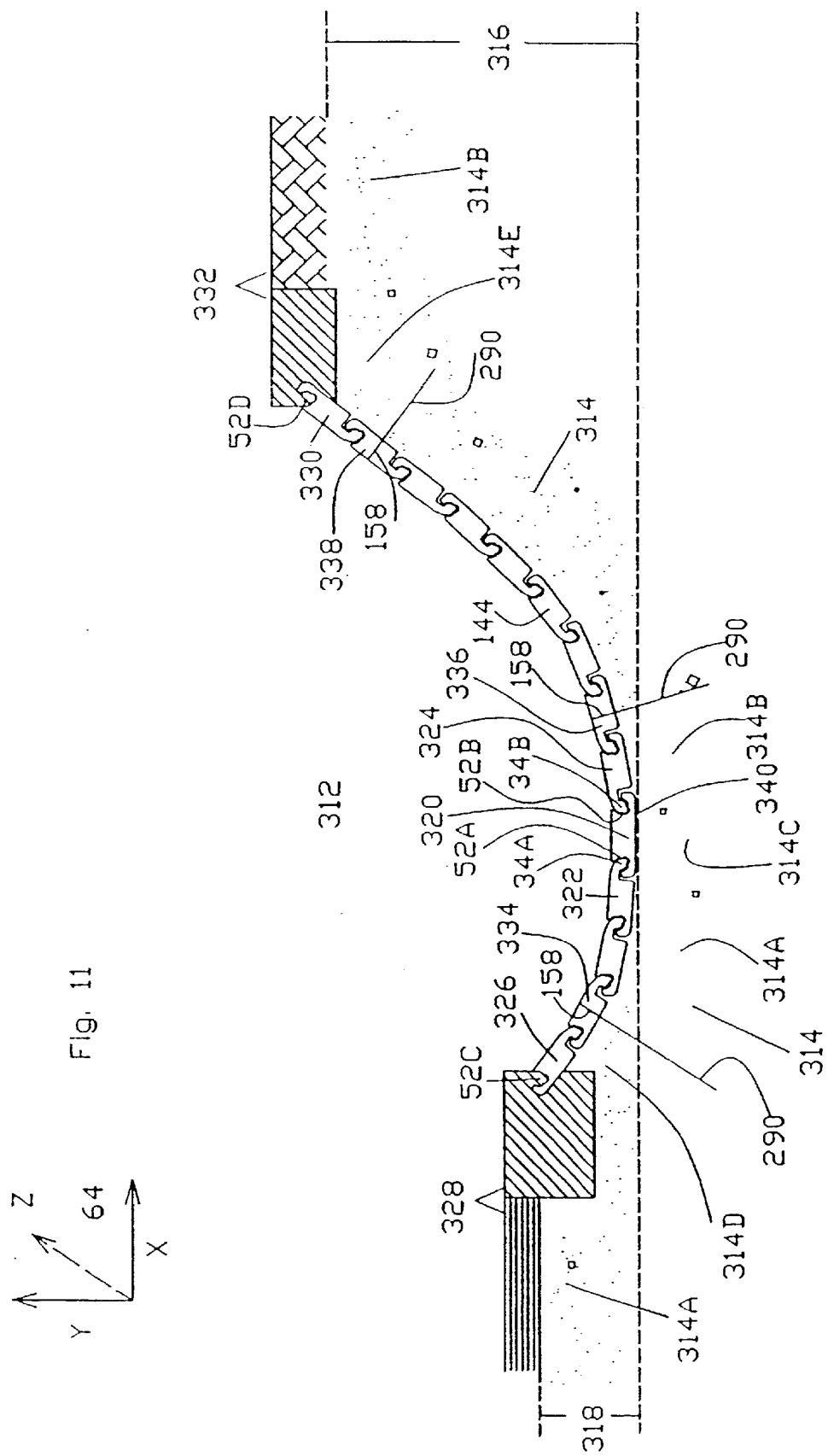
FIG. 11 is a side view diagram of the ground surface cover system of interlocking elements, as applied in practice to an exemplary double inclined ground surface, in accordance with the present invention.

In addition to being another interlocking element of the ground surface cover system, center interlocking element 130 is uniquely functional with respect to enabling convenient and efficient installation of a series of interlocking elements along the bottom, and along both sides, of ground featuring a double incline, as illustrated and described in FIG. 11.

Figure 4A:
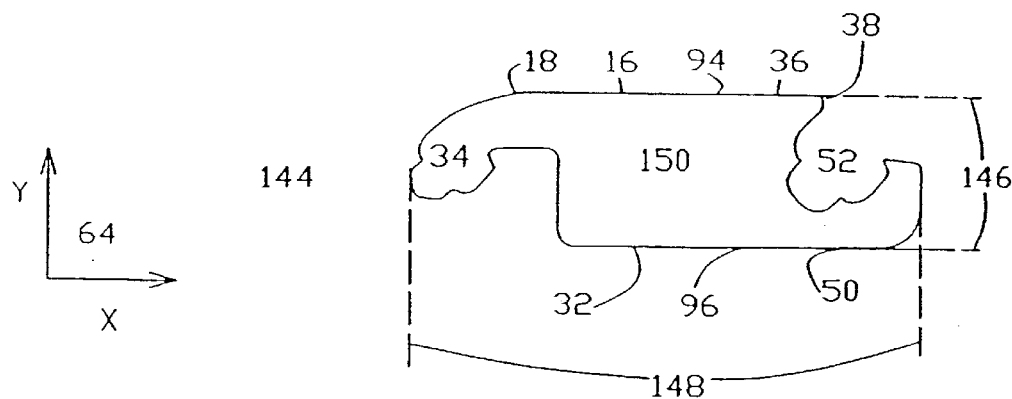
FIG. 4A is a schematic view illustrating one side of a level top and bottom configured interlocking element, in accordance with the present invention.

FIG. 4A is a schematic view illustrating one side of a level top and level bottom configured interlocking element. Exemplary interlocking element 144 may be of variable overall element length 148 and of variable overall element height 146. The contour of side 150 of interlocking element 144 includes element end level top surface segment 16, extends outward and down past bend 18, features element or joint tongue 34, in continuity with, and extending down and around to element level bottom surface segment 32, an element opposite end level top surface segment 36, extends outward and down past bend 33, features element or joint channel 52, in continuity with, and extending down and around to element level bottom surface segment 50, an element middle level top surface segment 94, in continuity with, and extending between element end level top surface segments 16 and 36, and an element middle level bottom surface segment 96, in continuity with, and extending between element end level bottom surface segments 32 and 50. Side 150 of element 144 features element level top surface segments 36, 94, and 16, all positioned in a same plane, and element level bottom surface segments 50, 96, and 32, all positioned in a different same plane, whereby the plane of element top surface segments is parallel to the plane of element bottom surface segments, with coordinate system 64 as reference.

Figure 4B:
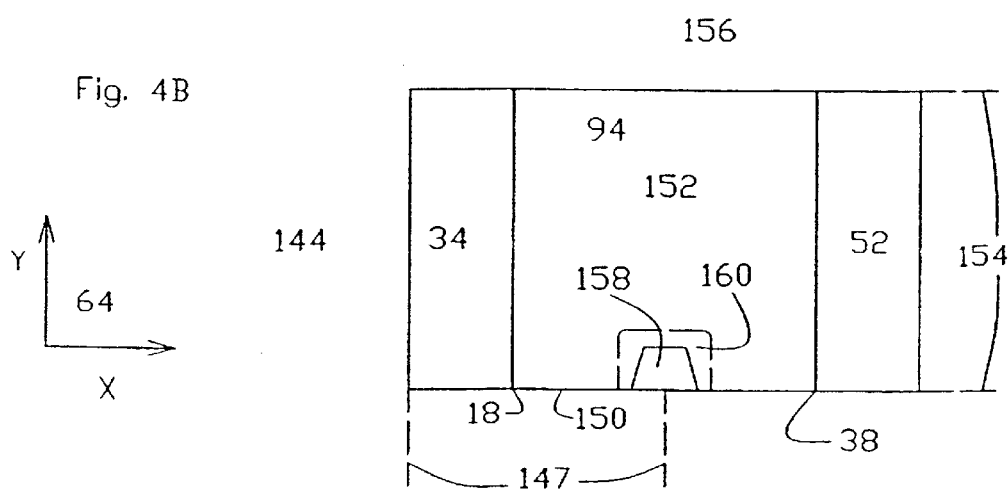
FIG. 4B is a schematic view illustrating the top of the level top and bottom configured interlocking element of FIG. 4a, in accordance with the present invention.

FIG. 4B is a schematic view illustrating the top of level top and bottom configured interlocking element 144 of FIG. 4A. Top 152 of interlocking element 144 includes element level top surface regions 36, 94, and 16, and top profiles of surface regions of element or joint tongue 34 and element or joint channel 52, corresponding to side 150 of FIG. 4A. Top 152 of exemplary interlocking element 144 features element width 154, element half-length 147, each of variable dimensions, and element side 156 opposite to element side 150 shown in FIG. 4A.

In a preferred alternative embodiment of the level top and level bottom interlocking element of the present invention, an element side, for example, element side 150 as shown in FIG. 4B, features optional pin groove 158, preferably located along the center of element side 150 at element half-length 147, of variable geometry and dimensions, preferably configured as an open trapezoid, spanning element volume vertically along entire element height 146 of element side 150 of level top and level bottom interlocking element 144. Pin groove 158 provides space for optional insertion of a pin (not shown), starting from the top opening of pin groove 158 and positioned vertically downward along the side of one interlocking element, or starting from the top opening of pin groove 158 and positioned vertically downward between the sides of two adjacent interlocking elements, respectively, of the ground surface cover system. The optional use of pins along the interlocking elements is primarily for increased holding strength and stability of those elements positioned at the top, bottom, or critical locations, of inclined ground, where such elements maintain a larger load of other interlocking elements of the system, as is further illustrated and described in FIGS. 9–11.

In another preferred alternative embodiment of the interlocking elements of the present invention, an element side, for example, element side 150, as shown in FIG. 4B, features optional water channel 160, preferably located along the center of element side 150 at element half-length 147, of variable geometry and dimensions, preferably configured as an open half donut, spanning element volume along part of element height 146 along element side 150 of level top and level bottom interlocking element 144. Water channel 160 functions to channel or trap water, enabling additional control of water flow and distribution throughout the erosion control system of interlocking elements during conditions of rainfall.

Figure 4C:
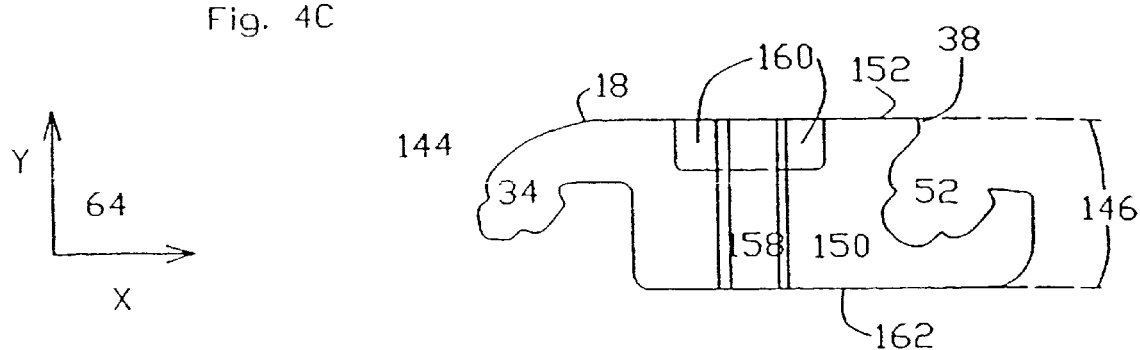
FIG. 4C is a schematic side view illustrating alternative optional features of the level top and bottom configured interlocking element of FIG. 4A, in accordance with the present invention.

FIG. 4C is a schematic side view illustrating alternative optional features of the level top and bottom configured interlocking element 144 of FIGS. 4A–4B. Optional pin groove 158, and optional water channel 160 are shown configured as part of element side 150. Optional pin groove 158 spans element volume vertically along entire element height 146, and optional water channel 160 spans element volume along part of element height 146 of level top and level bottom interlocking element 144. Element level bottom surface segment 162 of element side 150 corresponds to element level bottom surface segments 50, 96, and 32, of element 144 (FIG. 4A).

Figure 4D:
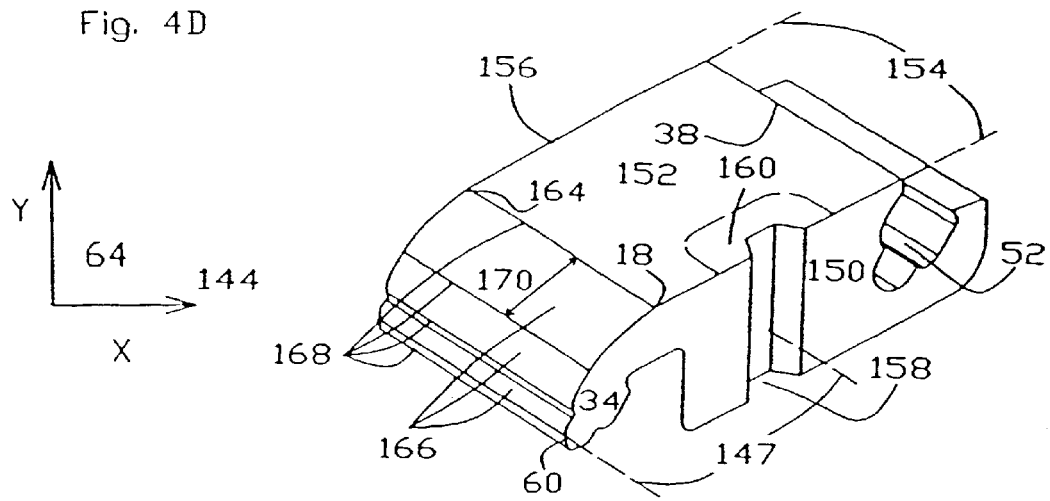
FIG. 4D is a perspective view of the level top and bottom configured interlocking element of FIG. 4A, featuring element or joint tongue pointing downward, and element or joint channel pointing upward, in accordance with the present invention.

FIG. 4D is a perspective view of level top and bottom configured interlocking element 144 of FIGS. 4A–4C, featuring element or joint tongue 34 pointing downward, and element or joint channel 52 pointing upward. The upper outer surface contour of joint tongue 34, extending outward and sloping downward from element surface bend 18 (FIG. 1) to joint tongue side lip 60 (FIG. 1), is of variable geometry, preferably, but not limited to, polygonal stepped, but may also be curved and smooth. Of polygonal stepped geometry, joint tongue surface steps 166, separated and bordered by joint tongue surface step edges 168, are preferably level and rectangular in shape having variable step width 170 and variable step number, e.g., shown here are three joint tongue surface steps 166, extending parallel to and along entire element width 154, from element surface bend 18 to element surface bend 164, of element 144. Optional pin, groove 158, and optional water channel 160 are shown as part of side 150 of element 144.

Figure 4E:
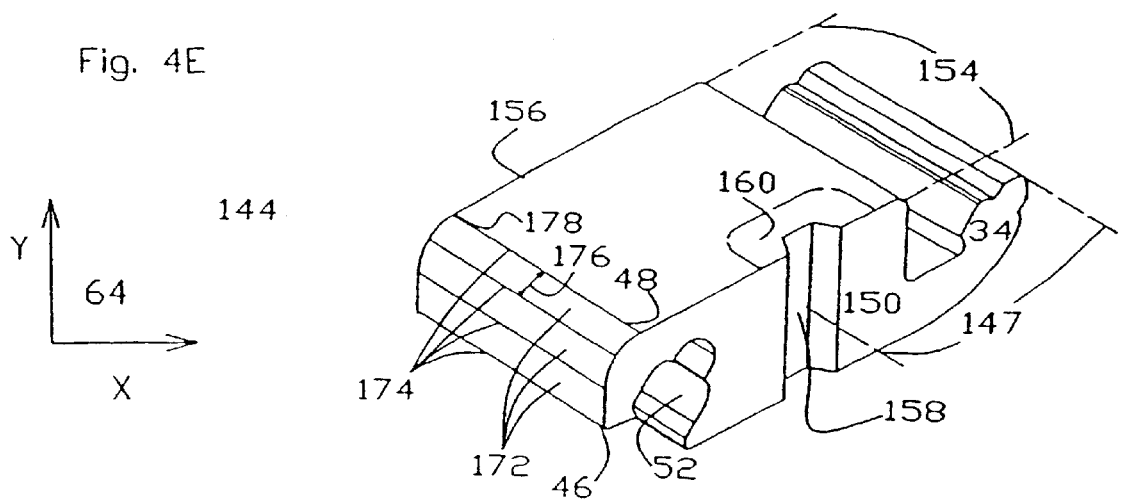
FIG. 4E is a perspective view of the level top and bottom configured interlocking element of FIG. 4A, featuring element or joint tongue pointing upward, and element or joint channel pointing downward, in accordance Keith the present invention.

FIG. 4E is a perspective view of level top and bottom configured interlocking element 144 of FIGS. 4A–4C, featuring element or joint tongue 34 pointing upward, and element or joint channel 52 pointing downward. FIG. 4E shows element 144 of FIG. 4D turned over. The upper outer surface contour of joint channel 52, extending outward and sloping downward from element surface bend 48 (FIG. 1) to joint channel bend 46 (FIG. 1), is of variable geometry, preferably, but not limited to, polygonal stepped, but may also be curved and smooth. Of polygonal stepped geometry, joint channel surface steps 172, separated and bordered by joint channel surface step edges 174, are preferably level and rectangular in shape having variable step width 176 and variable step number, e.g., shown here are three joint channel surface steps 172, extending parallel to and along entire element width 154, from element surface bend 48 to element surface bend 178, of element 144. Perspective side views of optional pin groove 158, and optional water channel 160 are shown as part of side 150 of element 144.

The functionality of the downward sloping surface contours of element or joint tongue 34 and element or joint channel 52 is for enabling water drainage down and along the outer surfaces of the interlocking elements. For a ground surface cover system featuring a pattern of several interlocking elements of the present invention, the downward sloping contours of a multitude of interlocked flexible joint tongues 34 and joint channels 52 forms extended lanes for which water can freely flow, in a guided manner according to the particular system geometric pattern and ground topography.

The perspective views of element 144 described and shown in FIGS. 4D and 4E are exemplary, whereby features, components, configurations, geometries, and relative positioning thereof, relating to element or joint tongue 34, element or joint channel 52, sides 150 and 156, optional pin groove 158, and optional water channel 160, are applicable to the other interlocking elements of the present invention.

Figure 5A:
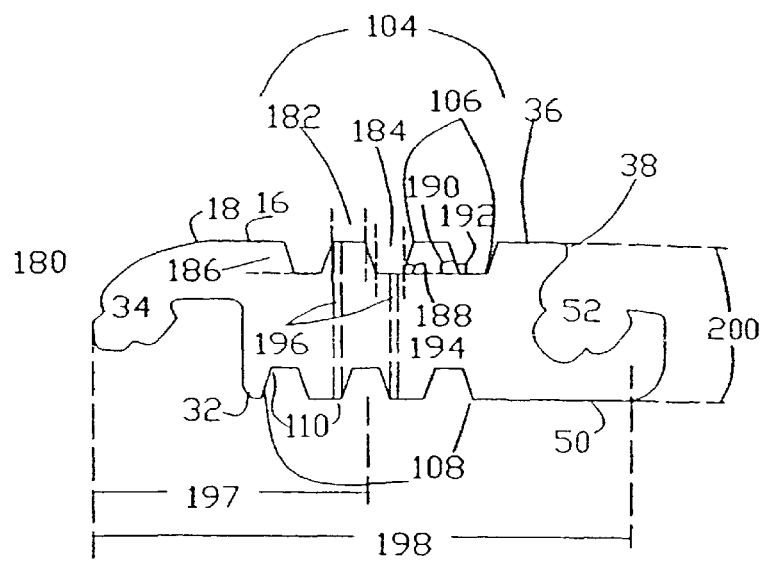
FIG. 5A is a schematic view illustrating one side of a ridged top configured interlocking element, in accordance with the present invention.

FIG. 5A is a schematic view illustrating one side of a ridged top and bottom configured interlocking element. Exemplary ridged top and ridged bottom interlocking element 180 may be of variable overall element length 198, element half-length 197, and of variable overall element height 200. The contour of element side 194 of ridged interlocking element 180 includes element end level top surface segment 16, extends outward and down past bend 18, features element or joint tongue 34, in continuity with, and extending down and around to element level bottom surface segment 32, an element opposite end level top surface segment 36, extends outward and down past bend 38, features element or joint channel 52, in continuity with, and extending down and around to element level bottom surface segment 50, an element middle ridged top surface segment 104, in continuity with, and extending between element end level top surface segments 16 and 36, and an element middle ridged bottom surface segment 108, in continuity with, and extending between element end level bottom surface segments 32 and 50. Side 194 of ridged element 180 features element top surface segments 36, 104, and 16, all positioned in a same plane, and element bottom surface segments 50, 108, and 32, all positioned in a different same plane, whereby the plane of element top surface segments is parallel to the plane of element bottom surface segments, with coordinate system 64 as reference.

In FIG. 5A, element middle ridged top surface segment 104 is of variable length extending between element level top surface segment 36 to element level top surface segment 16. Ridged top surface segment 104 features ridges 106 of variable dimensions, including ridge upper segment length 182, ridge lower segment length 184, ridge height 186, and ridge segment angles 188, 190, and 192. Oppositely positioned element middle ridged bottom surface segment 108 is of variable length extending between element level bottom surface segment 32 to element level bottom surface segment 50. Ridged bottom surface segment 108 features ridges 110 of variable dimensions (not referenced), similar to the dimensions of ridged top surface segment 104, including ridge upper segment length, ridge lower segment length, ridge height, and ridge segment angles. Preferably, element top surface ridges 106, and element bottom surface ridges 110, are parallel to each other, along the x-axis of reference coordinate system 64, throughout length 198 of ridged element 180.

In a preferred alternative embodiment of the present invention, ridged top and ridged bottom interlocking element 180 features optional pin groove 196 (shown in FIG. 5A as dashed lines, representing position of the pin groove in the plane of the page, as part of element side 193 located opposite to element side 194, shown in FIG. 5B), preferably located along the center of element side 193 at element half-length 197, of variable geometry and dimensions, and preferably configured as an open trapezoid, spanning vertically along element height 200 of ridged interlocking element 180. Similar to the preferred alternative embodiment of level top and level bottom interlocking element 144 of FIG. 4B, pin groove 196 provides space for optional insertion of a pin (not shown), starting from the top opening of pin groove 196 and positioned vertically downward along the side of one interlocking element, or starting from the top openings and positioned vertically downward between the sides of two adjacent interlocking elements, respectively, of the ground surface cover system.

Figure 5B:
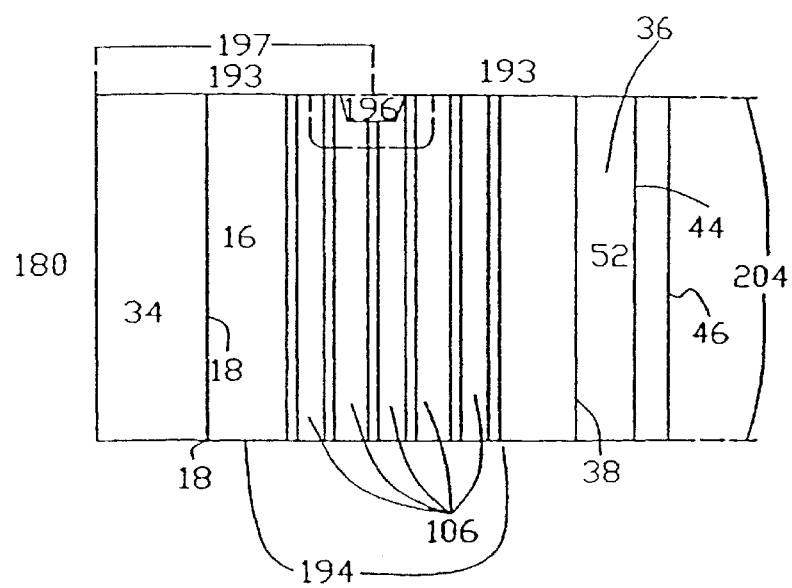
FIG. 5B is a schematic view illustrating the top of the ridged top configured interlocking element of FIG. 5A, in accordance with the present invention.

FIG. 5B is a schematic view illustrating the top of the ridged top and bottom configured interlocking element 180 of FIG. 5A. Top surface of exemplary ridged interlocking element 180 includes element ridged top surface region 104 featuring ridges 106, element level top surface regions 36 and 16, and top profiles of surface regions of element or joint tongue 34 and element or joint channel 52, corresponding to side 194 of FIG. 5A. Preferably, element top surface ridges 106 are parallel to each other, along the x-axis of reference coordinate system 64, throughout length 198 of ridged element 180. Top surface of ridged interlocking element 180 features element width 204 of variable dimension, and element opposite side 193 featuring pin groove 196, located opposite to element side 194.

Figure 6A:
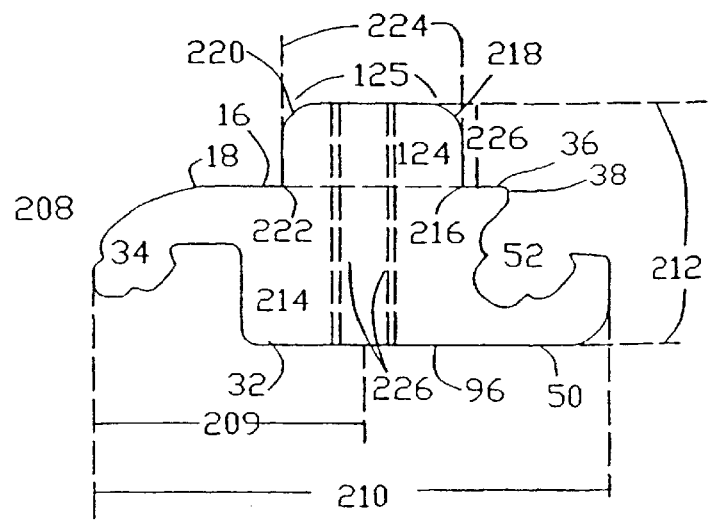
FIG. 6A is a schematic view illustrating one side of an elevated level top and level bottom configured interlocking element, in accordance with the present invention.

FIG. 6A is a schematic view illustrating one side of an elevated level top and level bottom configured interlocking element. In this alternative preferred embodiment, exemplary interlocking element 208 may be of variable overall element length 210, element half-length 209, and of variable overall element height 212. The contour of side 214 of interlocking element 208 includes element end level top surface segment 16, extends outward and down past bend 18, features element or joint tongue 34, in continuity with, and extending down and around to element level bottom surface segment 32, an element middle level bottom surface segment 96, in continuity with, and extending between element end level bottom surface segments 32 and 50, extends up and around element or joint channel 52, in continuity with, and extending up and around bend 38 to element opposite end level top surface segment 36, extends around bend 216, Up and around bend 218, along element elevated level top surface segment 125, around bend 220, down and around bend 222, and extends back to element level top surface segment 16.

In FIG. 6A, element elevated level top surface segment 125 extends between element end level top surface segments 16 and 36. Element elevated level top surface region 124 is of variable geometry with variable dimensions. Element elevated level top surface region 124 is preferably, but not limited to, a rectangle of elevated top length 224 and elevated top height 226. Element side 214 of element 208 includes element level bottom surface segments 32, 96, and 50, positioned in a first same plane, element level top surface segments 16 and 36, positioned in a second same plane, and element elevated level top surface segment 125 positioned in a third plane, whereby all three planes of surface segments are parallel to each other, with coordinate system 64 as reference.

In a preferred alternative embodiment of the elevated level top and level bottom interlocking element of the present invention, element 208 features optional pin groove 226 (shown in FIG. 6A as dashed lines, representing position of the pin groove in the plane of the page, as part of element side 213 located opposite to element side 214), preferably located along the center of element side 214 at element half-length 209, of variable geometry and dimensions, and preferably configured as an open trapezoid, spanning vertically along element height 212 of elevated level top interlocking element 208, and having the same function of providing space for optional insertion of a pin (not shown), starting from the top opening of pin groove 226 and positioned vertically downward along the side of one interlocking element, or starting from the top opening of pin groove 226 and positioned vertically downward between the sides of two adjacent interlocking elements, respectively, of the ground surface cover system, as described for level top and level bottom interlocking element 144 of FIG. 4B, and for ridged top and ridged bottom interlocking element 180 of FIG. 5A.

Figure 6B:
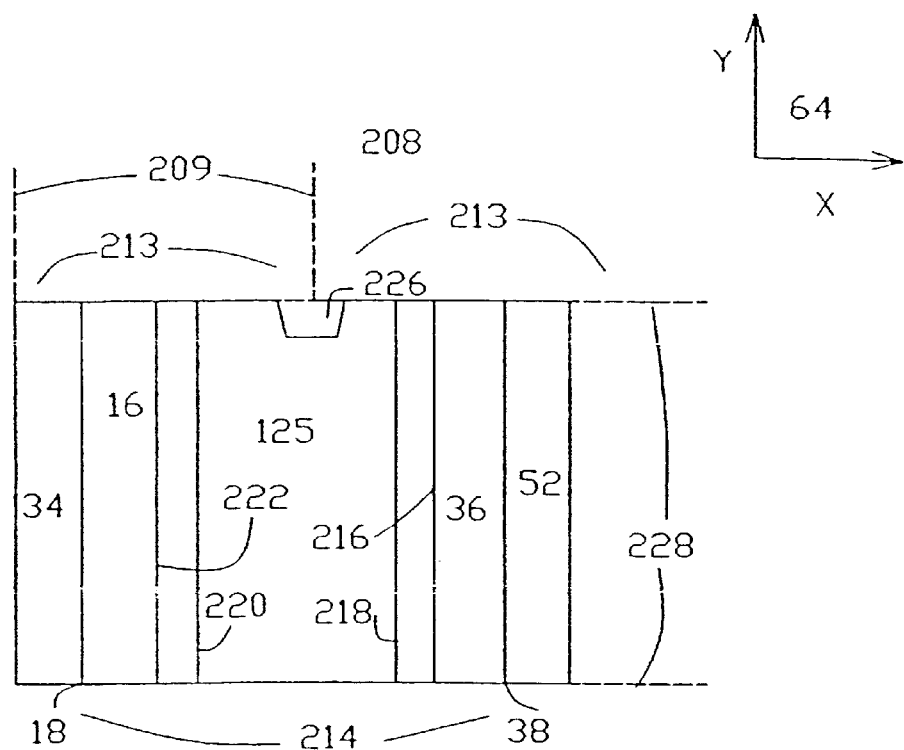
FIG. 6B is a schematic view illustrating the top of the elevated level top and level bottom configured interlocking element of FIG. 6A, in accordance with the present invention.

FIG. 6B is a schematic view illustrating the top of elevated level top and level bottom configured interlocking element 208 of FIG. 6A. Top surface of exemplary elevated level top and level bottom interlocking element 208 includes elevated level top surface region 125, top profiles of surface segments extending from bend 216 to bend 218, and extending from bend 220 to bend 222, element level top surface regions 36 and 16, and top profiles of surface regions of element or joint tongue 34 and element or joint channel 52, corresponding to side 214 of FIG. 6A. Top surface of elevated level top interlocking element 208 features element width 228 of variable dimension, and element opposite side 213 featuring optional pin groove 226, located opposite to element side 214 as shown in FIG. 6A. Preferably, element top surface segments 216, 218, 220, and 222, and element top surface segments formed by extension of each bend 38 and bend 18 across width 228 of element 208, are parallel to each other, along the x-axis of reference coordinate system 64, throughout element length 210 of elevated level top element 208.

Figure 7:
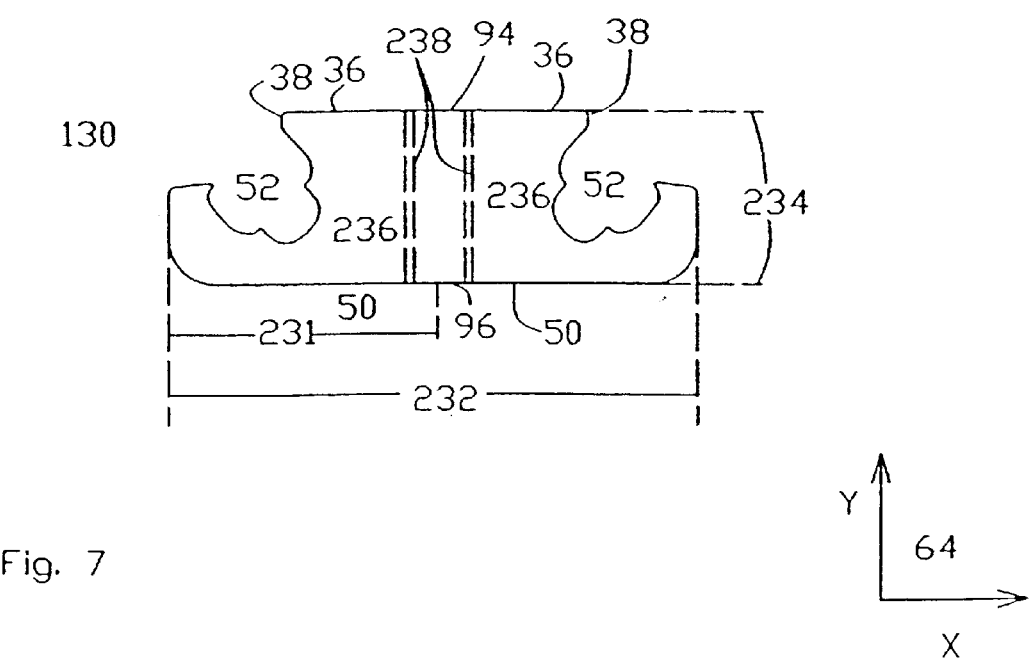
FIG. 7 is a schematic view illustrating one side of a level top and bottom configured center interlocking element, in accordance with the present invention.

FIG. 7 is a schematic view illustrating one side of a level top and bottom configured center interlocking element. Exemplary center interlocking element 130 features two identical element or joint channels 52, each being compatible for mechanical engagement via mating or interlocking to an element or joint tongue 34 of another interlocking element. Center element 130 may be of variable overall element length 232 and of variable overall element height 234. The contour of element side 236 of center element 130 includes two element end level top surface segments 36, each extending outward and down past bend 38, features two element or joint channels 52, each in continuity with, and extending down and around to element level bottom surface segment 50, an element middle level top surface segment 94, in continuity with, and extending between element end level top surface segments 36, and an element middle level bottom surface segment 96, in continuity with, and extending between element end level bottom surface segments 50. Element side 236 of element 130 features element level top surface segments 36 and 94 positioned in a same plane, and element level bottom surface segments 50 and 96 positioned in a different same plane, whereby the plane of element top surface segments is parallel to the plane of element bottom surface segments, with coordinate system 64 as reference.

In a preferred alternative embodiment of the present invention, level top and level bottom center interlocking element 130 features optional pin groove 238 (shown in FIG. 7 as dashed lines, representing position of the pin groove in the plane of the page, as part of element side located opposite to element side 236), preferably located along the center of element side 236 at element half-length 231, of variable geometry and dimensions, and preferably configured as an open trapezoid, spanning vertically along element height 234 of level top and level bottom center interlocking element 130, and having the same function of providing space for optional insertion of a pin (not shown), as previously described and shovel in FIGS. 4B–6B.

FIG. 8 is a schematic sequential series of side views illustrating a method of interlocking the elements via the flexible interlocking joint. In the sequential series of side views 240A through 240E illustrating a preferred method of interlocking the elements via the flexible joint of the present invention, exemplary level top and level bottom interlocking element 242 featuring tongue 34 is to be mechanically engaged or interlocked to exemplary level top and level bottom interlocking element 244 featuring channel 52. Channel 52 of element 244 is appropriately contoured for insertion or mechanical engagement of tongue 34 of element 242. Insertion or engagement of tongue 34 into channel 52 is limited to a small range of positions and angles of tongue 34 relative to channel 52, according to actual relative shapes and dimensions of tongue 34 and channel 52. In particular, the objective is to insert tongue 34, having a configuration featuring tongue surface region contour extending along bends 26, 24, 22, and 19, with a widest chord 246 extending between bend 24 and bend 19, into channel 52, having a configuration featuring channel surface region contour extending along bends 46, 44, 43, and 38, with an opening chord 248 extending between bend 44 and bend 38.

The method of insertion of tongue 34 of element 242 into channel 52 of element 52 is straightforward and is based on positioning element 242 through a sweeping range of decreasing angles 250 such to enable mechanical engagement of the elements, where angle 250 is the angle formed between tongue tip bottom tangent 56 (FIG. 1) and line 57, where line 57 is parallel to the x-axis of reference coordinate system 64. The process of inserting tongue 34 of element 242 into channel 52 of element 244 until mechanical engagement is attained, is continued until angle 250 is approximately zero, where in such position, tongue tip bottom tangent 56 is parallel to and in the same plane as line 57. The process of mechanical engagement or interlocking opposing ends of a pair of opposing interlocking elements is completely reversible i.e., mechanical disengagement or unlocking opposing ends of a pair of interlocked interlocking elements is readily accomplished by reversing the above process, with reference to the reverse of the sequence illustrated FIG. 8. This reversible process is sequentially illustrated in the series of side views 240A through 240D.

Side view 240E illustrates an extreme horizontal position of element 242 interlocked to element 244 via the flexible joint. Following completion of initial engagement of the elements, side view 240D, elements 242 and 244 are flexed or moved horizontally with respect to each other along the plane of the x-axis of reference coordinate system 64, such that surface segment of tongue 34, extending between bends 24 and 26, is in substantial physical contact with surface segment of channel 52, extending between bends 43 and 44, as described and illustrated in FIG. 1C. This method of mechanical engagement or interlocking of elements is applicable to all elements featured in this invention.

FIGS. 9A through 9C are schematic top views of different preferred embodiments of patterns of the system of interlocking elements featuring flexible interlocking joints, and corresponding methods of forming the different patterns. Patterns 262 through 266 could feature any combination of the various configurations of level, ridged, elevated, or center, interlocking elements already described and illustrated in this invention, however, for illustrative purposes, exemplary level top and level bottom interlocking elements 144 described and illustrated in particular, in FIGS. 2A, and 4A–4E, are referred to here. Optional pin groove 158 of interlocking element 144 is shown throughout the different patterns of the system in FIGS. 9A–9C for illustrative purpose only, and its presence is not meant to be limiting with respect to the present invention. The detailed method of mechanically engaging or interlocking individual elements is applicable here, and includes the description and illustrations related to FIG. 8. Moreover, the method of mechanically engaging or interlocking individual elements is completely reversible, whereby, patterns of the system of interlocked elements can be partly, or completely, taken apart by mechanically disengaging or unlocking the interlocked elements via the flexible interlocking joint.

FIG. 9A is a schematic top view of the system of interlocking elements, and the method of forming a closed, non-staggered pattern. Exemplary closed pattern 262 of interlocking elements features rows 252A through 252D of interlocking elements, and columns 254A through 254D of interlocking elements.

According to relative directions and geometries of the features and components of interlocking elements 144 shown in the side, top, and perspective views of FIGS. 2A, and 4A–4E, using coordinate system 64 as reference, right end row 252A features element tongues 34 exposed and non-interlocked and element channels 52 interlocked to element tongues 34 of adjacent row 252B, middle rows 252B and 252C feature element tongues 34 and element channels 52 interlocked and mechanically engaged to corresponding element channels 52 and element tongues 34, of corresponding adjacent rows, and end row 252D features element tongues 34 interlocked to element channels 52 of adjacent row 252C and element channels 52 unoccupied and non-interlocked. In pattern 262, rows 252A through 252D are adjacent to each other in that row interfaces 256 feature tongues 34 interlocked to channels 52, thereby, forming rows of the flexible interlocking joint of the present invention.

A preferred method of forming the system featuring closed, non-staggered pattern 262 is by initially forming row 252A, featuring tongues 34 facing outside, and exposed and non-interlocked, by placing element sides 150 and 156 of interlocking elements 144 immediately adjacent to each other, leaving no space between them. Following completion of closed pattern row 252A, additional rows 252B through 252D are formed by interlocking or mechanically engaging entire width 154 (FIG. 4D) of tongue 34 of each added interlocking element 144 to an entire width 154 of channel 52 of one other interlocking element 144 of a previous row, until a new row is complete, thereby forming columns 254A through 254D, such that all element side to element side interfaces 258 of a given column of interlocking elements 144 are positioned parallel to each other and in the same vertical plane, with respect to reference coordinate system 64.

FIG. 9B is a schematic top view of the system of interlocking elements, and the method of forming a closed, staggered pattern. Pattern 264 shown in FIG. 9B is closed, as described and shown for pattern 262 in FIG. 9A, whereby rows 252A through 252D feature element sides 150 and 156 of exemplary interlocking elements 144 immediately adjacent to each other, without space between them, thereby forming element to element interfaces 258 extending across each row.

A preferred method of forming the system featuring closed, staggered pattern 264 is by initially forming row 252A, featuring tongues 34 facing out, exposed and non-interlocked, by placing element sides 150 and 156 of interlocking elements 144 immediately adjacent to each other, leaving no space between them. Following completion of closed pattern row 252A, additional rows 252B through 252D are sequentially formed by interlocking or mechanically engaging each tongue 34 of interlocking elements 144 to two separate channels 52 of two adjacent interlocking elements 144. According to this method, separate and distinguishable sets of columns, i.e., columns 254A through 254D, and columns 255A through 255C, are formed such that element side to element side or column interfaces 258 of each of the two formed sets of columns of interlocking elements 144 are horizontally located in alternate rows 252A through 252D, positioned parallel to each other, and in the same plane, with respect to reference coordinate system 64.

Staggered pattern 264 illustrated in FIG. 9B is periodic, whereby staggered positions of interlocking elements 144 are periodic in alternating rows, e.g., positions of element sides 150 and 156, and interfaces 258 in row 252A are in the same x-axis planes as positions of element sides and interfaces in row 252C, and likewise for alternating rows 252B and 252D. This represents a special case of staggered patterns of the system of interlocking elements of the present invention, where, in general, the staggered patterns of interlocking elements need not be periodic.

FIG. 9C is a schematic top view of the system of interlocking elements, and the method of forming an open, staggered pattern. Pattern 266 shown in FIG. 9C is open, whereby rows 252A through 252D feature a number of interlocking elements and corresponding element sides 150 and 156 of exemplary interlocking elements 144 spaced apart, forming variable sized rectangular regions 268 surrounded by a variable number of elements, according to specific location of a given region 268. As a result of featuring openings in the system of interlocking elements, pattern 266 is staggered, in accordance with the description of FIG. 9B.

A preferred method of forming the system featuring open, staggered pattern 266 is by placing element sides 150 and 156 of interlocking elements 144 at variable distances from each other, leaving variable spaces between selected elements 144, and interlocking or mechanically engaging each tongue 34 of interlocking elements 144 to two separate, not necessarily equal parts of channels 52 of two interlocking elements 144, thereby forming non-periodic rows 252A through 252D, of elements, where elements 144 are positioned in variable x-axis planes with respect to reference coordinate system 64.

Features and capabilities of flexibility and directional movement of the flexible interlocking joint of the present invention (FIGS. 1A–1D) are all applicable to the interlocking elements and joints formed thereof in the different preferred embodiments of patterns of the ground surface cover system of erosion control described and illustrated in FIGS. 9A–9C. Applying the property of flexibility of the interlocking joints to the installation and use of the interlocking elements featured in the different system patterns provides significant capability of custom designing an effective ground surface cover system for erosion control for a wide variety of erosion prone ground surface topographies. This translates to achieving the main objective of effectively controlling or minimizing ground movement during a potential erosion process, by designing an erosion control system which provides high strength and long term stability, patterns for efficient water flow and water distribution, flexible adjustment to ground movement, capability of including landscape, economic and feasible manufacturing and installation, replaceability, and reusability.

Flexibility of individual pairs of interlocked elements is directly scalable to flexibility of an overall ground surface cover erosion control system. For example, system pattern 262 of FIG. 9A should be well suited to erosion prone ground surface requiring a firm, closed, non-staggered, but flexible surface cover, whereas, system pattern 266 of FIG. 9C should be well suited to erosion prone ground surface featuring botanic landscape, where, in addition to providing space for inclusion of botanic landscape in between the interlocking elements of the ground surface cover system, it is desirable that at least part of the water flow be directed into the ground in the regions of botanic growth.

Figure 10:
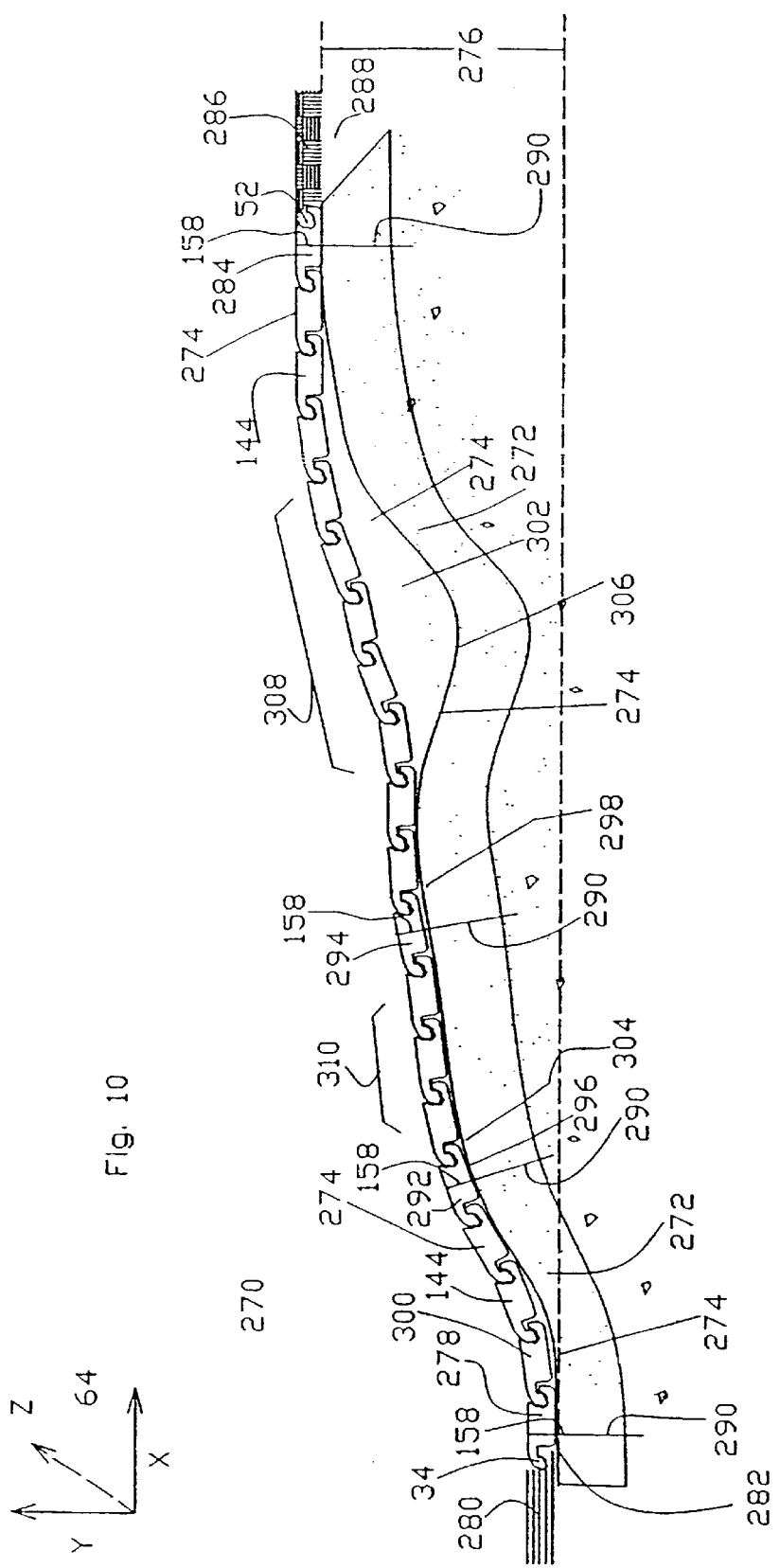
FIG. 10 is a side view diagram of the ground surface cover system of interlocking elements, as applied in practice to an exemplary single inclined ground surface featuring a cavity and a protrusion, illustrating flexibility of the system, in accordance with the present invention.

FIG. 10 is a side view diagram of the ground surface cover system of interlocking elements, as applied in practice to an exemplary single inclined ground surface featuring a cavity and a protrusion, illustrating flexibility of the system. Ground surface cover system 270 features ground region 272 with ground surface region 274 requiring erosion control. FIG. 10 shows a side view diagram, with coordinate system 64 as reference, of ground surface region 274 spanning along xz-planes of a single continuous incline of incline height 276 in the y-direction, initially absent of any noticeable cavity or protrusion along the xz-plane or y-direction. System 270 of a layer of exemplary level top and level bottom interlocking elements 144 featuring flexible joints 10, 66, 70, 78 (FIGS. 1A–1D) of the present invention covers ground surface region 274 spanning xz-planes along the y-direction incline. System 270 includes a bottom row, in the z-direction, of bottom end interlocking elements 278 attached by element tongues 34 to bottom end rigid non-mobile foundation 280, where foundation 280 is preferably made of, but not limited to, concrete, metal, or a combination thereof, both 278 and 280 being in contact with bottom end ground surface region 282, and system 270 includes a top row, in the z-direction, of top end interlocking elements 284 attached by element channels 52 to top end rigid non-mobile foundation 286, where foundation 286 is preferably made of, but not limited to, concrete, metal, or a combination thereof, both 284 and 286 being in contact with top end ground surface region 288. Interlocked elements form a continuous series of interlocked rows, positioned in xz-planes, spanning the y-direction incline of ground surface region 274, in between bottom end interlocking elements 278 and top end interlocking elements 284, featuring at least one selected pattern, for example, closed non-staggered, closed staggered, or open staggered, in accordance with the description and illustrations of FIGS. 9A–9C.

In FIG. 10, in an alternative preferred embodiment of ground surface cover system 270, optional pins 290 are positioned through pin grooves 158, in accordance with description and illustrations of FIGS. 4A–4E, in between the sides of selected interlocking elements, for example, bottom end interlocking elements 278, top end interlocking elements 284, and intermediate interlocking elements 292 and 294, through ground surface region 274 and ground region 272, located at selected positions along ground surface region 274, for example, 282, 288, 296, and 298, respectively, requiring additional stability of ground surface cover system 270 for effective erosion control.

In FIG. 10, in another alternative preferred embodiment of ground surface cover system 270, optional botanic landscape (not shown) is positioned in spaces, in between the sides of selected interlocking elements, along ground surface region 274, in accordance with description and illustration of open pattern 266 in FIG. 9C.

With reference to FIG. 10, following is a preferred method of establishing ground surface cover system 270 of a layer of exemplary level top and level bottom interlocking elements 144 featuring flexible joints 10, 66, 70, 78 (FIGS. 1A–1D) of the present invention. System 270 is constructed, on-site, upon ground surface region 274, preferably starting at bottom end ground surface region 282, as part of ground region 272 requiring erosion control. First row of a layer of interlocking elements 278 is placed on bottom end ground surface region 282 in the z-direction, and these interlocking elements are attached to foundation 280, where foundation 280 is preferably made of, but not limited to, concrete, metal, or a combination thereof, both 278 and 280 placed in contact with bottom end ground surface region 282. First row interlocking elements are preferably placed with element tongues 34 attached to foundation 280, enabling first row element channels 52 to be flexibly interlocked to element tongues 34 of second row of interlocking elements 300. Second row of a layer of interlocking elements 300 is flexibly interlocked to first row 278, by using the preferred method of interlocking elements with flexible joints in accordance with the description and illustration of FIG. 8.

Henceforth, in similar manner, a continuous series of rows, featuring at least one selected pattern, for example, closed non-staggered, closed staggered, or open staggered, positioned along xz-planes, along the y-direction incline of ground surface region 274, in accordance with the description and illustrations of FIGS. 9A–9C, of interlocking elements is constructed until reaching top end ground surface region 288, at which a last row of interlocking elements 284 is attached to rigid and non-mobile foundation 286, where foundation 286 is preferably made of, but not limited to, concrete, metal, or a combination thereof, both 284 and 286 placed in contact with top end ground surface region 288.

With reference to FIG. 10, in an alternative preferred embodiment of the method of forming ground surface cover system 270, optional pins 290 are placed in between and along the sides of selected interlocking elements, for example, bottom end interlocking elements 278, top end interlocking elements 284, and intermediate interlocking elements 292 and 294, through ground surface region 274 and ground region 272, located at selected positions along ground surface region 274, for example, 282, 288, 296, and 298, respectively, requiring additional stability of ground surface cover system 270 for effective erosion control.

With reference to FIG. 10, in another alternative preferred embodiment of the method of forming ground surface cover system 270, optional botanic landscape (not shown) is placed in spaces in between the sides of selected interlocking elements, along ground surface region 274, in accordance with description and illustration of pattern 266 in FIG. 9C.

FIG. 10 also illustrates different realistic scenarios of the functionality of ground surface cover system 270 following topological changes of ground surface region 274 due to localized movement of ground region 272. In the event of formation of cavity 302 and/or protrusion 304 at localized places 306 and/or 304, respectively, in ground surface region 274, system 270 of interlocking elements remains intact, in a flexible, interlocked mode. Interlocking elements 308 and/or interlocking elements 310, in the immediate vicinity of cavity 302 and/or protrusion 304, respectively, undergo directional movement, including angular, horizontal, and/or vertical, in accordance with descriptions and illustrations of FIGS. 1A–1D, according to the particular nature, directionality, and dimensions of formation of cavity 302, and/or protrusion 304. Interlocking elements 308 and/or interlocking elements 310, respectively, of ground surface cover system 270 in the immediate vicinity of cavity 302 and/or protrusion 304, respectively, are amenable to adjustment, via addition or subtraction, of interlocking elements. Alternatively, localized places 306 and/or 304 of cavity and/or protrusion formation, respectively, may be adjusted by addition of ground or ground filler material, and/or subtraction of ground, thereby, returning ground surface region 274 to its original level inclined form absent of cavities or protrusions, enabling re-establishment of stable and effective erosion control ground surface cover system 270.

FIG. 11 is a side view diagram of the ground surface cover system of interlocking elements, as applied in practice to an exemplary double inclined ground surface. Ground surface cover system 312 features ground surface region 314 requiring erosion control. FIG. 11 shows a side view diagram, with coordinate system 64 as reference, of ground surface region 314 spanning along xz-planes of a continuous double incline with first incline ground surface region 314A and second incline ground surface region 314B, featuring first and second incline ground surface region heights 316 and 318, respectively, each in the y-direction, and double incline bottom ground surface region 314C, where ground surface region 314 is absent of any noticeable cavity or protrusion along the xz-plane or y-direction.

In FIG. 11, system 312 of a layer of exemplary level top and level bottom interlocking elements 144 featuring flexible joints 10, 66, 70, 78 (FIGS. 1A–1D) of the present invention covers ground surface region 314 spanning xz-planes along the y-direction of the continuous double incline. System 312 includes, in the z-direction, double incline bottom row of center interlocking elements 320 (refer to center interlocking element 130, as described and illustrated in FIGS. 3 an 7) attached from first channels 52A of double incline bottom center interlocking elements 320 to tongues 34A of first row of first incline interlocking elements 322, and attached from second channels 52B of same double incline bottom center interlocking elements 320 to tongues 34B of first row of second incline interlocking elements 324. System 312 also includes, in the z-direction, last row of first incline interlocking elements 326 attached from element channels 54C to first incline rigid non-mobile foundation 328, where foundation 328 is preferably made of, but not limited to, concrete, metal, or a combination thereof, both 326 and 328 being in contact with first incline ground surface region 314D, and system 312 includes, in the z-direction, last row of second incline interlocking elements 330 attached from element channels 52D to second incline rigid non-mobile foundation 332, where foundation 332 is preferably made of, but not limited to, concrete, metal, or a combination thereof, both 330 and 332 being in contact with second incline ground surface region 314E. Interlocked elements form a continuous series of interlocked rows, positioned in xz-planes, spanning the y-direction of first incline ground surface region 314A and the y-direction of second incline ground surface region 314B of ground surface region 314, in between last row of first incline interlocking elements 326 and last row of second incline interlocking elements 330, featuring at least one selected pattern, for example, closed non-staggered, closed staggered, or open staggered, in accordance with the description and illustrations of FIGS. 9A–9C.

In FIG. 11, in an alternative preferred embodiment of ground surface cover system 312, optional pins 290 are positioned through pin grooves 158, in accordance with description and illustrations of FIGS. 4A–4E, in between the sides of selected interlocking elements, for example, first incline row of interlocking elements 334, second incline rows of interlocking elements 336 and 338, through first incline ground surface region 314A and second incline ground region 314B, respectively, located at selected positions along double incline ground surface region 314 requiring additional stability of ground surface cover system 312 for effective erosion control.

In FIG. 11, in another alternative preferred embodiment of ground surface cover system 312, optional botanic landscape (not show) is positioned in spaces, in between the sides of selected interlocking elements, along double incline ground surface region 314, in accordance with description and illustration of open pattern 266 in FIG. 9C.

With reference to FIG. 11, following is a preferred method of establishing ground surface cover system 312 of a layer of exemplary level top and level bottom interlocking elements 144 featuring flexible joints 10, 66, 70, 78 (FIGS. 1A–1D) of the present invention. System 312 is constructed, on-site, upon double incline ground surface region 314, preferably starting at double incline bottom ground surface region 314C, as part of ground surface region 314 requiring erosion control. Double incline bottom row of center interlocking elements 320 is placed on level ground surface 340 along double incline bottom ground surface region 314C, in the z-direction. Double incline bottom row of center interlocking elements 320 is attached from first channels 52A of double incline bottom center interlocking elements 320 to tongues 34A of first row of first incline interlocking elements 322, by using the preferred method of interlocking elements with flexible joints in accordance with the description and illustration of FIG. 8. Henceforth, in similar manner, a continuous series of rows, featuring at least one selected pattern, for example, closed non-staggered, closed staggered, or open staggered, positioned along xz-planes, along the y-direction of first incline ground surface region 314A, in accordance with the description and illustrations of FIGS. 9A–9C, of interlocking elements is constructed until reaching last row of first incline interlocking elements 326 of first incline ground surface region 314D, at which last row of first incline interlocking elements 326 is attached to first incline rigid and non-mobile foundation 328, where foundation 328 is preferably made of, but not limited to, concrete, metal, or a combination thereof, both 326 and 328 placed in contact with first incline ground surface region 314D.

Then, double incline bottom row of center interlocking elements 320 is attached from second channels 52B of double incline bottom center interlocking elements 320 to tongues 34B of second row of first incline interlocking elements 324, by using the preferred method of interlocking elements faith flexible joints in accordance with the description and illustration of FIG. 8. Henceforth, in similar manner, a continuous series of rows, featuring at least one selected pattern, for example, closed non-staggered, closed staggered, or open staggered, positioned along xz-planes, along the y-direction of second incline ground surface region 314B, in accordance with the description and illustrations of FIGS. 9A–9C, of interlocking elements is constructed until reaching last row of second incline interlocking elements 330 of second incline ground surface region 314E, at which last row of second incline interlocking elements 330 is attached to second incline rigid and non-mobile foundation 332, where foundation 332 is preferably made of, but not limited to, concrete, metal, or a combination thereof, both 330 and 332 placed in contact with second incline ground surface region 314E.

The preferred embodiment of the method of forming ground surface cover system 312 with reference to FIG. 11, clearly illustrates the advantageous functionality of center interlocking elements 320, whereby center interlocking elements 320 feature two element channels 52A and 52B. In the case of a ground surface region featuring a double incline, such as ground surface region 314, two ground surface inclines 314A and 314B are covered by interlocking elements. Interlocking elements 144 of the present invention feature one tongue 34 and one channel 52. If, instead of double incline bottom center elements 320, interlocking elements 144 were used, such that double incline bottom elements featured one end having an element channel and another end having an element tongue, formation of one of the two first rows of interlocking elements interlocked to the double incline bottom elements would begin with tongues 34 of one of the ends of the double incline bottom elements interlocked to the channels 52 of the interlocking elements of one of the two first rows. Accordingly, due to the topography of the bottom of the double incline of ground surface region 314, in order to interlock or mechanically engage one of the two first rows of interlocking elements to the row of double incline bottom interlocking elements, on-site at the bottom of the double incline, it would be necessary to remove or dig out ground from underneath tongues 34 of the double incline bottom elements for proper angular positioning of channels 52 for interlocking to tongues 34 of the corresponding opposing interlocking elements, thereby forming flexible interlocking joints, in accordance with the preferred method of interlocking elements of the present invention. Using center interlocking elements 320 precludes the need for ground removal and therefore bypasses this limitation of forming ground surface cover system 312 of the present invention, for effective erosion control.

With reference to FIG. 11, in an alternative preferred embodiment of the method of forming ground surface cover system 312, optional pins 290 are placed in between and along the sides of selected interlocking elements, for example, next to last row of first incline interlocking elements 334, next to last row of second incline interlocking elements 338, and intermediate row of second incline interlocking elements 336, through first incline ground surface region 314A and second incline ground surface region 314B, respectively, located at selected positions along ground surface region 314 requiring additional stability of ground surface cover system 312 for effective erosion control.

With reference to FIG. 11, in another alternative preferred embodiment of the method of forming ground surface cover system 312, optional botanic landscape (not shown) is placed in spaces in between the sides of selected interlocking elements, along ground surface region 314, in accordance with description and illustration of pattern 266 in FIG. 9C.

While the invention has been described with respect to one embodiment, it will be appreciated that many variations, modifications and other applications of the invention may be made.

What is claimed is:

1. A ground surface cover system for use in controlling erosion caused by water upon a ground surface, the ground surface cover comprising at least one layer upon the ground surface of a plurality of interlocking elements, wherein opposing ends of a pair of opposing said interlocking elements are flexibly interlocked by a flexible interlocking joint, said flexible interlocking joint defining mechanical engagement of an interlocking element tongue transversely extending outward from one said opposing end of a first said interlocking element of said pair to an interlocking channel transversely extending outward from one said opposing end of a second said interlocking element of said pair, such that engagement and disengagement of said tongue and said channel is limited to a first range of positions and angles of said tongue relative to said channel, wherein said first range of positions and angles is less than, and falls within, a full range of positions and angles available to said tongue relative to said channel while said tongue is engaged in said channel.

2. The ground surface cover system as defined in claim 1, wherein formation of said flexible interlocking joint allows for relative movement of said opposing ends of said interlocking elements of said flexible interlocking joint, said relative movement includes angular movement, horizontal movement, and vertical movement.

3. The ground surface cover system as defined in claim 1, wherein formation of said flexible interlocking joint allows for relative positioning of said opposing ends of said interlocking elements of said flexible interlocking joint, said relative positioning includes angular positioning, horizontal positioning, and vertical positioning.

4. The ground surface cover system as defined in claim 1, wherein formation of said flexible interlocking joint is reversible, said reversibility including mechanical engagement of said opposing ends of said interlocking elements of said flexible interlocking joint and mechanical disengagement of said opposing ends of said interlocking elements of said flexible interlocking joint.

5. The ground surface cover system as defined in claim 1, wherein top and bottom configurations of each of said interlocking elements of said flexible interlocking joint includes level top and level bottom interlocking element, ridged top and level bottom interlocking clement, and, elevated top and level bottom interlocking element.

6. The ground surface cover system as defined in claim 1, wherein said plurality of said interlocking elements includes at least one interlocking element featuring an interlocking clement tongue transversely extending outward from first end of said at least one interlocking element and an interlocking element channel transversely extending outward from second end of said at least one interlocking element.

7. The ground surface cover system as defined in claim 1, wherein said plurality of said interlocking elements includes at least one center interlocking element featuring an interlocking element channel transversely extending outward from first end of said at least one center interlocking element; and an interlocking element channel transversely extending outward from second end of said at least one center interlocking element.

8. The ground surface cover system as defined in claim 7, wherein said center interlocking element is part of said at least one layer of said a plurality of said interlocking elements.

9. The ground surface cover system as defined in claim 1, wherein at least one of said plurality of said interlocking elements features a pin groove extending vertically along element height along at least one side of said interlocking element, said pin groove configured for vertical placement of a pin along said element height along said at least one side of said interlocking element and into the ground surface.

10. The ground surface cover system as defined in claim 1, wherein at least one of said plurality of said interlocking elements features a water channel extending along part of element height along at least one side of said interlocking element, said water channel configured for trapping water.

11. The ground surface cover system as defined in claim 1, wherein said at least one layer upon the ground surface of said a plurality of said interlocking elements features at least one pattern of said interlocking elements, said at least one pattern includes closed non-staggered, closed staggered, and open staggered.

12. The ground surface cover system as defined in claim 1, wherein said at least one layer upon the ground surface of said a plurality of said interlocking elements features at least one pattern of said interlocking elements, said at least one pattern includes botanic landscape in spaces in between sides of said interlocking elements.

13. The ground surface cover system as defined in claim 1, wherein the ground surface includes at least one incline.

14. The ground cover system as defined in claim 1, wherein said interlocking elements are constructed from concrete.

15. A method of controlling erosion caused by water upon a ground surface, the method comprising the steps of:
 (a) providing the ground surface to be erosion controlled; and
 (b) covering the ground surface with at least one layer upon the ground surface of a plurality of interlocking elements, wherein opposing ends of a pair of opposing said interlocking elements are flexibly interlocked by a flexible interlocking joint, said flexible interlocking joint defining mechanical engagement of an interlocking element tongue transversely extending outward from on e said opposing end of a first said interlocking element of said pair to an interlocking channel transversely extending outward from one said opposing end of a second said interlocking element of said pair, such that engagement and disengagement of said tongue and said channel is limited to a first range of positions and angles of said tongue relative to said channel, wherein said first range of positions and angles is less than, and falls within, a full range of positions and angles available to said tongue relative to said channel while said tongue is engaged in said channel.

16. The method of erosion control as defined in claim 15, wherein formation of said flexible interlocking joint allows for relative movement of said opposing ends of said interlocking elements of said flexible interlocking joint, said relative movement includes angular movement, horizontal movement, and vertical movement.

17. The method of erosion control as defined in claim 15, wherein formation of said flexible interlocking joint allows for relative positioning of said opposing ends of said interlocking elements of said flexible interlocking joint, said relative positioning includes angular positioning, horizontal positioning, and vertical positioning.

18. The method of erosion control as defined in claim 15, wherein formation of said flexible interlocking joint is reversible, said reversibility including mechanical engagement of said opposing ends of said interlocking elements of said flexible interlocking joint and mechanical disengagement of said opposing ends of said interlocking elements of said flexible interlocking joint.

19. The method of erosion control as defined in claim 15, wherein top and bottom configurations of each of said interlocking elements of said flexible interlocking joint includes level top and level bottom interlocking element, ridged top and level bottom interlocking element, and, elevated top and level bottom interlocking element.

20. The method of erosion control as defined in claim 15, wherein said plurality of said interlocking elements includes at least one interlocking element featuring an interlocking element tongue transversely extending outward from first end of said at least one interlocking element and an interlocking element channel transversely extending outward from second end of said at least one interlocking element.

21. The method of erosion control as defined in claim 15, wherein said plurality of said interlocking elements includes at least one center interlocking element featuring an interlocking element channel transversely extending outward from first end of said at least one center interlocking element and an interlocking element channel transversely extending outward from second end of said at least one center interlocking element.

22. The method of erosion control as defined in claim 21, wherein said interlocking center element is part of said at least one layer of said a plurality of said elements.

23. The method of erosion control as defined in claim 15, wherein at least one of said plurality of said interlocking elements features a pin groove extending vertically along element height along at least one side of said interlocking element, said pin groove configured for vertical placement of a pin along said clement height along said at least one side of said interlocking element and into the ground surface.

24. The method of erosion control as defined in claim 15 wherein at least one of said plurality of said interlocking elements features a water channel extending along part of element height along at least one side of said interlocking element, said water channel configured for trapping water.

25. The method of erosion control as defined in claim 15, wherein said at least one layer upon the ground surface of said a plurality of said interlocking elements features at least one pattern of said interlocking elements, said at least one pattern includes closed non-staggered, closed staggered, arid open staggered.

26. The method of erosion control as defined in claim 15, wherein said at least one layer upon the ground surface of said a plurality of said interlocking elements features at least one pattern or said interlocking elements, said at least one pattern includes botanic landscape in spaces in between sides of said interlocking elements.

27. The method of erosion control as defined in claim 15, wherein the ground surface includes at least one incline.

28. The method of erosion control as defined in claim 15, wherein said interlocking elements arc constructed from concrete.

29. A flexible interlocking joint of interlocking elements for use in a ground surface cover for controlling erosion caused by water upon a ground surface, the flexible interlocking joint comprising an interlocking element tongue transversely extending outward from one opposing end of a first interlocking of a pair of the interlocking elements mechanically engaged to an interlocking element channel transversely extending outward from one opposing end of a second interlocking element of said pair of the interlocking elements, such that engagement and disengagement of said tongue and said channel is limited to a first range of positions and angles of said tongue relative to said channel, wherein said first range of positions and angles is less than, and falls within, a full range of positions and angles available to said tongue relative to said channel while said tongue is engaged in said channel.

30. The flexible interlocking joint as defined in claim 29, wherein formation of the flexible interlocking joint allows for relative movement of said opposing ends of the interlocking elements of the flexible interlocking joint, said relative movement includes angular movement, horizontal movement, and vertical movement.

31. The flexible interlocking joint as defined in claim 29, wherein formation of the flexible interlocking joint allows for relative positioning of said opposing ends of the interlocking elements of the flexible interlocking joint, said relative positioning includes angular positioning horizontal positioning, and vertical positioning.

32. The flexible interlocking joint as defined in claim 29, wherein formation of the flexible interlocking joint is reversible, said reversibility including mechanical engagement of said opposing ends of the interlocking elements of the flexible interlocking joint and mechanical disengagement of said opposing ends of the interlocking elements of the flexible interlocking joint.

33. The flexible interlocking joint as defined in claim 29, wherein formation of the flexible interlocking joint is reversible, said reversibility including mechanical engagement of said opposing ends of the interlocking elements of the flexible interlocking joint and mechanical disengagement of said opposing ends of the interlocking elements of the flexible interlocking joint.

34. The flexible interlocking joint as defined in claim 29, wherein the interlocking elements are constructed from concrete.

35. A ground surface cover system for use in controlling erosion caused by water upon a ground surface, the ground surface cover comprising at least one layer upon the ground surface of a plurality of interlocking elements, wherein opposing ends of a pair of opposing said interlocking elements are flexibly interlocked by a flexible interlocking joint, said flexible interlocking joint defining mechanical engagement of an interlocking element tongue transversely extending outward from one said opposing end of a first said interlocking element of said pair to an interlocking channel transversely extending outward from one said opposing end of a second said interlocking element of said pair, such that engagement and disengagement of said tongue and said channel is limited to a first range of positions and angles of said tongue relative to said channel, wherein said first range of positions and angles is less than, and falls within, a full range of positions and angles available to said tongue relative to said channel while said tongue is engaged in said channel, and wherein at least one of said plurality of said interlocking elements features a pin groove extending vertically along element height along at least one side of said interlocking element, said pin groove configured for vertical placement of a pin along said element height along side at least one side of said interlocking element and into the ground.

36. A method of controlling erosion caused by water upon a ground surface, the method comprising the steps of:
(a) providing the ground surface to be erosion controlled; and
(b) covering the ground surface with at least one layer upon the ground surface of a plurality of interlocking elements, wherein opposing ends of a pair of opposing said interlocking elements are flexibly interlocked by a flexible interlocking joint, said flexible interlocking joint defining mechanical engagement of an interlocking element tongue transversely extending outward from one said opposing end of a first said interlocking element of said pair to an interlocking channel transversely extending outward from one said opposing end of a second said interlocking element of said pair, such that engagement and disengagement of said tongue and said channel is limited to a first range of positions and angles of said tongue relative to said channel, wherein said first range of positions and angles is less than, and falls within, a full range of positions and angles available to said tongue relative to said channel while said tongue is engaged in said channel;

wherein at least one of said plurality of said interlocking elements features a pin groove extending vertically along element height along at least one side of said interlocking element, said pin groove configured for vertical placement of a pin along said element height along side at least one side of said interlocking element and into the ground.

* * * * *